(12) United States Patent
Chalecki et al.

(10) Patent No.: US 7,376,673 B1
(45) Date of Patent: May 20, 2008

(54) OFFLINE EDITING OF XML FILES USING A SOLUTION

(75) Inventors: Jason P. Chalecki, Redmond, WA (US); Kelvin S. Yiu, Seattle, WA (US); Prakash Sikchi, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 893 days.

(21) Appl. No.: 10/723,862

(22) Filed: Nov. 26, 2003

Related U.S. Application Data

(63) Continuation-in-part of application No. 10/395,490, filed on Mar. 24, 2003.

(51) Int. Cl.
*G06F 17/30* (2006.01)

(52) U.S. Cl. ............... 707/200; 707/104.1; 707/203

(58) Field of Classification Search .............. 707/1, 707/100, 200, 203, 104.1; 715/513; 717/100, 717/101, 121
See application file for complete search history.

(56) References Cited

U.S. PATENT DOCUMENTS

| | | | |
|---|---|---|---|
| 4,498,147 A | 2/1985 | Agnew et al. | |
| 4,514,800 A | 4/1985 | Gruner et al. | |
| 4,641,274 A | 2/1987 | Swank | |
| 4,674,040 A | 6/1987 | Barker et al. | |
| 4,723,211 A | 2/1988 | Barker et al. | |
| 4,739,477 A | 4/1988 | Barker et al. | |
| 4,815,029 A | 3/1989 | Barker et al. | |
| 4,847,749 A | 7/1989 | Collins et al. | |
| 4,910,663 A | 3/1990 | Bailey | |
| 4,933,880 A | 6/1990 | Borgendale et al. | |
| 4,962,475 A | 10/1990 | Hernandez et al. | |
| 5,072,412 A | 12/1991 | Henderson, Jr. et al. | |
| 5,179,703 A | 1/1993 | Evans | |
| 5,182,709 A | 1/1993 | Makus | |
| 5,187,786 A | 2/1993 | Densmore et al. | |
| 5,191,645 A | 3/1993 | Carlucci et al. | |
| 5,195,183 A | 3/1993 | Miller et al. | |
| 5,204,947 A | 4/1993 | Bernstein et al. | |

(Continued)

FOREIGN PATENT DOCUMENTS

EP  0 841 615 A2  5/1998

(Continued)

OTHER PUBLICATIONS

Hall, Richard Scott, "Agent-based Software Configuration and Deployment," Thesis of the University of Colorado, Online, Dec. 31, 1999, retrieved from the Internet on Nov. 7, 2003: <http://www.cs.colorado.edu/users/rickhall/documents/ThesisFinal.pdf>, 169 pages.

(Continued)

*Primary Examiner*—Cheryl Lewis

(57) ABSTRACT

A user can edit an XML data file offline without the user having to discover or deploy a solution for the XML data file. A processing instruction (PI) in the XML data file is read to determine the solution's origin. The PI contains an entity that can be a href attribute that points to a URL, a name, a target having a character string identifying the application that created an electronic form associated with the XML data file, or a href attribute and at least one of a PI version and a product version. Security precautions for executing the solution based on the solution's origin are determined and the solution is silently installed from a source other than the solution's origin within a sandbox enforcing the security precautions. Deployment within a sandbox limits the operations that the solution application can perform.

30 Claims, 5 Drawing Sheets

U.S. PATENT DOCUMENTS

| | | |
|---|---|---|
| 5,206,951 A | 4/1993 | Khoyi et al. |
| 5,218,672 A | 6/1993 | Morgan et al. |
| 5,237,680 A | 8/1993 | Adams et al. |
| 5,249,275 A | 9/1993 | Srivastava |
| 5,274,803 A | 12/1993 | Dubin et al. |
| 5,297,249 A | 3/1994 | Bernstein et al. |
| 5,297,283 A | 3/1994 | Kelly, Jr. et al. |
| 5,313,631 A | 5/1994 | Kao |
| 5,313,646 A | 5/1994 | Hendricks et al. |
| 5,317,686 A | 5/1994 | Salas et al. |
| 5,333,317 A | 7/1994 | Dann |
| 5,339,423 A | 8/1994 | Beitel et al. |
| 5,339,424 A | 8/1994 | Fushimi |
| 5,341,478 A | 8/1994 | Travis, Jr. et al. |
| 5,369,766 A | 11/1994 | Nakano et al. |
| 5,369,778 A | 11/1994 | San Soucie et al. |
| 5,371,675 A | 12/1994 | Greif et al. |
| 5,377,323 A | 12/1994 | Vasudevan |
| 5,379,419 A | 1/1995 | Heffenan et al. |
| 5,381,547 A | 1/1995 | Flug et al. |
| 5,390,325 A | 2/1995 | Miller |
| 5,396,623 A | 3/1995 | McCall et al. |
| 5,408,665 A | 4/1995 | Fitzgerald |
| 5,410,646 A | 4/1995 | Tondevold et al. |
| 5,410,688 A | 4/1995 | Williams et al. |
| 5,412,772 A | 5/1995 | Monson |
| 5,434,975 A | 7/1995 | Allen |
| 5,436,637 A | 7/1995 | Gayraud et al. |
| 5,438,659 A | 8/1995 | Notess et al. |
| 5,440,744 A | 8/1995 | Jacobson et al. |
| 5,446,842 A | 8/1995 | Schaeffer et al. |
| 5,459,865 A | 10/1995 | Heninger et al. |
| 5,481,722 A | 1/1996 | Skinner |
| 5,497,489 A | 3/1996 | Menne |
| 5,504,898 A | 4/1996 | Klein |
| 5,517,655 A | 5/1996 | Collins et al. |
| 5,535,389 A | 7/1996 | Elder et al. |
| 5,542,070 A | 7/1996 | LeBlanc et al. |
| 5,550,976 A | 8/1996 | Henderson et al. |
| 5,551,035 A | 8/1996 | Arnold et al. |
| 5,572,643 A | 11/1996 | Judson |
| 5,572,648 A | 11/1996 | Bibayan |
| 5,577,252 A | 11/1996 | Nelson et al. |
| 5,581,686 A | 12/1996 | Koppolu et al. |
| 5,581,760 A | 12/1996 | Atkinson et al. |
| 5,602,996 A | 2/1997 | Powers, III et al. |
| 5,608,720 A | 3/1997 | Biegel et al. |
| 5,625,783 A | 4/1997 | Ezekiel et al. |
| 5,627,979 A | 5/1997 | Chang et al. |
| 5,630,126 A | 5/1997 | Redpath |
| 5,634,121 A | 5/1997 | Tracz et al. |
| 5,640,544 A | 6/1997 | Onodera et al. |
| 5,644,738 A | 7/1997 | Goldman et al. |
| 5,649,099 A | 7/1997 | Theimer et al. |
| 5,659,729 A | 8/1997 | Nielsen |
| 5,664,178 A | 9/1997 | Sinofsky |
| 5,668,966 A | 9/1997 | Ono et al. |
| 5,669,005 A | 9/1997 | Curbow et al. |
| 5,682,536 A | 10/1997 | Atkinson et al. |
| 5,689,703 A | 11/1997 | Atkinson et al. |
| 5,704,029 A | 12/1997 | Wright, Jr. |
| 5,706,501 A | 1/1998 | Horikiri et al. |
| 5,717,939 A | 2/1998 | Bricklin et al. |
| 5,721,824 A | 2/1998 | Taylor |
| 5,740,439 A | 4/1998 | Atkinson et al. |
| 5,742,504 A | 4/1998 | Meyer et al. |
| 5,745,683 A | 4/1998 | Lee et al. |
| 5,745,712 A | 4/1998 | Turpin et al. |
| 5,758,184 A | 5/1998 | Lucovsky et al. |
| 5,758,358 A | 5/1998 | Ebbo |
| 5,761,408 A | 6/1998 | Kolawa et al. |
| 5,761,683 A | 6/1998 | Logan et al. |
| 5,764,984 A | 6/1998 | Loucks |
| 5,764,985 A | 6/1998 | Smale |
| 5,778,372 A | 7/1998 | Cordell et al. |
| 5,778,402 A | 7/1998 | Gipson |
| 5,784,555 A | 7/1998 | Stone |
| 5,790,796 A | 8/1998 | Sadowsky |
| 5,798,757 A | 8/1998 | Smith |
| 5,801,701 A | 9/1998 | Koppolu et al. |
| 5,802,304 A | 9/1998 | Stone |
| 5,806,079 A | 9/1998 | Rivette et al. |
| 5,815,830 A | 9/1998 | Anthony |
| 5,826,265 A | 10/1998 | Van Huben et al. |
| 5,835,777 A | 11/1998 | Staelin |
| 5,838,906 A | 11/1998 | Doyle et al. |
| 5,842,018 A | 11/1998 | Atkinson et al. |
| 5,845,077 A | 12/1998 | Fawcett |
| 5,845,090 A | 12/1998 | Collins, III et al. |
| 5,854,630 A | 12/1998 | Nielsen |
| 5,859,973 A | 1/1999 | Carpenter et al. |
| 5,862,372 A | 1/1999 | Morris et al. |
| 5,864,819 A | 1/1999 | De Armas et al. |
| 5,907,704 A | 5/1999 | Gudmundson et al. |
| 5,910,895 A | 6/1999 | Proskauer et al. |
| 5,911,776 A | 6/1999 | Guck |
| 5,915,112 A | 6/1999 | Boutcher |
| 5,922,072 A | 7/1999 | Hutchinson et al. |
| 5,929,858 A | 7/1999 | Shibata et al. |
| 5,940,075 A | 8/1999 | Mutschler, III et al. |
| 5,950,010 A | 9/1999 | Hesse et al. |
| 5,956,481 A | 9/1999 | Walsh et al. |
| 5,960,199 A | 9/1999 | Brodsky et al. |
| 5,963,964 A | 10/1999 | Nielsen |
| 5,974,454 A | 10/1999 | Apfel et al. |
| 5,982,370 A | 11/1999 | Kamper |
| 5,987,480 A | 11/1999 | Donohue et al. |
| 5,991,710 A | 11/1999 | Papineni et al. |
| 5,991,877 A | 11/1999 | Luckenbaugh |
| 5,995,103 A | 11/1999 | Ashe |
| 5,999,740 A | 12/1999 | Rowley |
| 6,014,135 A | 1/2000 | Fernandes |
| 6,016,520 A | 1/2000 | Facq et al. |
| 6,018,743 A | 1/2000 | Xu |
| 6,026,379 A | 2/2000 | Haller et al. |
| 6,026,416 A | 2/2000 | Kanerva et al. |
| 6,031,989 A | 2/2000 | Cordell |
| 6,035,297 A | 3/2000 | Van Huben et al. |
| 6,035,309 A | 3/2000 | Dauerer et al. |
| 6,044,205 A | 3/2000 | Reed et al. |
| 6,052,531 A | 4/2000 | Waldin et al. |
| 6,052,710 A | 4/2000 | Saliba et al. |
| 6,054,987 A | 4/2000 | Richardson |
| 6,072,870 A | 6/2000 | Nguyen et al. |
| 6,078,326 A | 6/2000 | Kilmer et al. |
| 6,078,327 A | 6/2000 | Liman et al. |
| 6,078,924 A | 6/2000 | Ainsbury et al. |
| 6,081,610 A | 6/2000 | Dwork et al. |
| 6,084,585 A | 7/2000 | Kraft et al. |
| 6,088,708 A | 7/2000 | Burch et al. |
| 6,091,417 A | 7/2000 | Lefkowitz |
| 6,094,657 A | 7/2000 | Hailpern et al. |
| 6,097,382 A | 8/2000 | Rosen et al. |
| 6,098,081 A | 8/2000 | Heidorn et al. |
| 6,108,637 A | 8/2000 | Blumenau |
| 6,108,783 A | 8/2000 | Krawczyk et al. |
| 6,115,646 A | 9/2000 | Fiszman et al. |
| 6,122,647 A | 9/2000 | Horowitz et al. |
| 6,144,969 A | 11/2000 | Inokuchi et al. |
| 6,151,624 A | 11/2000 | Teare et al. |
| 6,154,128 A | 11/2000 | Wookey et al. |
| 6,163,772 A | 12/2000 | Kramer et al. |
| 6,167,521 A | 12/2000 | Smith et al. |
| 6,167,523 A | 12/2000 | Strong |

| | | |
|---|---|---|
| 6,182,095 B1 | 1/2001 | Leymaster et al. |
| 6,188,401 B1 | 2/2001 | Peyer |
| 6,191,797 B1 | 2/2001 | Politis |
| 6,192,367 B1 | 2/2001 | Hawley et al. |
| 6,195,661 B1 | 2/2001 | Filepp et al. |
| 6,199,204 B1 | 3/2001 | Donohue |
| 6,209,128 B1 | 3/2001 | Gerard et al. |
| 6,216,152 B1 | 4/2001 | Wong et al. |
| 6,219,698 B1 | 4/2001 | Iannucci et al. |
| 6,225,996 B1 | 5/2001 | Gibb et al. |
| 6,235,027 B1 | 5/2001 | Herzon |
| 6,253,366 B1 | 6/2001 | Mutschler, III |
| 6,253,374 B1 | 6/2001 | Dresevic et al. |
| 6,263,313 B1 | 7/2001 | Milsted et al. |
| 6,266,810 B1 | 7/2001 | Tanaka et al. |
| 6,268,852 B1 | 7/2001 | Lindhorst et al. |
| 6,275,227 B1 | 8/2001 | DeStefano |
| 6,275,599 B1 | 8/2001 | Adler et al. |
| 6,281,896 B1 | 8/2001 | Alimpich et al. |
| 6,282,711 B1 | 8/2001 | Halpern et al. |
| 6,286,033 B1 | 9/2001 | Kishinsky et al. |
| 6,292,897 B1 | 9/2001 | Gennaro et al. |
| 6,297,819 B1 | 10/2001 | Furst |
| 6,300,948 B1 | 10/2001 | Geller et al. |
| 6,307,955 B1 | 10/2001 | Zank et al. |
| 6,308,179 B1 | 10/2001 | Petersen et al. |
| 6,311,271 B1 | 10/2001 | Gennaro et al. |
| 6,321,259 B1 | 11/2001 | Ouellette et al. |
| 6,321,334 B1 | 11/2001 | Jerger et al. |
| 6,327,628 B1 | 12/2001 | Anuff et al. |
| 6,331,864 B1 | 12/2001 | Coco et al. |
| 6,342,907 B1 | 1/2002 | Petty et al. |
| 6,343,302 B1 | 1/2002 | Graham |
| 6,345,256 B1 | 2/2002 | Milsted et al. |
| 6,345,278 B1 | 2/2002 | Hitchcock et al. |
| 6,345,361 B1 | 2/2002 | Jerger et al. |
| 6,347,323 B1 | 2/2002 | Garber et al. |
| 6,349,408 B1 | 2/2002 | Smith |
| 6,353,926 B1 | 3/2002 | Parthesarathy et al. |
| 6,356,906 B1 | 3/2002 | Lippert et al. |
| 6,357,038 B1 | 3/2002 | Scouten |
| 6,366,907 B1 | 4/2002 | Fanning et al. |
| 6,366,912 B1 | 4/2002 | Wallent et al. |
| 6,367,013 B1 | 4/2002 | Bisbee et al. |
| 6,369,840 B1 | 4/2002 | Barnett et al. |
| 6,369,841 B1 | 4/2002 | Salomon et al. |
| 6,374,402 B1 | 4/2002 | Schmeidler et al. |
| 6,381,742 B2 | 4/2002 | Forbes et al. |
| 6,381,743 B1 | 4/2002 | Mutschler, III |
| 6,389,434 B1 | 5/2002 | Rivette et al. |
| 6,393,456 B1 | 5/2002 | Ambler et al. |
| 6,396,488 B1 | 5/2002 | Simmons et al. |
| 6,408,311 B1 | 6/2002 | Baisley et al. |
| 6,421,070 B1 | 7/2002 | Ramos et al. |
| 6,421,656 B1 | 7/2002 | Cheng et al. |
| 6,425,125 B1 | 7/2002 | Fries et al. |
| 6,429,885 B1 | 8/2002 | Saib et al. |
| 6,434,563 B1 | 8/2002 | Pasquali et al. |
| 6,434,564 B2 | 8/2002 | Ebert |
| 6,442,563 B1 | 8/2002 | Bacon et al. |
| 6,442,755 B1 | 8/2002 | Lemmons et al. |
| 6,446,110 B1 | 9/2002 | Lection et al. |
| 6,449,617 B1 | 9/2002 | Quinn et al. |
| 6,457,009 B1 | 9/2002 | Bollay |
| 6,460,058 B2 | 10/2002 | Koppolu et al. |
| 6,463,419 B1 | 10/2002 | Kluss |
| 6,470,349 B1 | 10/2002 | Heninger et al. |
| 6,473,800 B1 | 10/2002 | Jerger et al. |
| 6,476,828 B1 | 11/2002 | Burkett et al. |
| 6,476,833 B1 | 11/2002 | Moshfeghi |
| 6,477,544 B1 | 11/2002 | Bolosky et al. |
| 6,480,860 B1 | 11/2002 | Monday |
| 6,487,566 B1 | 11/2002 | Sundaresan |
| 6,490,601 B1 | 12/2002 | Markus et al. |
| 6,493,702 B1 | 12/2002 | Adar et al. |
| 6,502,101 B1 | 12/2002 | Verprauskus et al. |
| 6,502,103 B1 | 12/2002 | Frey et al. |
| 6,505,230 B1 | 1/2003 | Mohan et al. |
| 6,505,300 B2 | 1/2003 | Chan et al. |
| 6,507,856 B1 | 1/2003 | Chen et al. |
| 6,516,322 B1 | 2/2003 | Meredith |
| 6,519,617 B1 | 2/2003 | Wanderski et al. |
| RE38,070 E | 4/2003 | Spies et al. |
| 6,546,546 B1 | 4/2003 | Van Doorn |
| 6,549,221 B1 | 4/2003 | Brown et al. |
| 6,549,878 B1 | 4/2003 | Lowry et al. |
| 6,549,922 B1 | 4/2003 | Srivastava et al. |
| 6,553,402 B1 | 4/2003 | Makarios et al. |
| 6,560,620 B1 | 5/2003 | Ching |
| 6,560,640 B2 | 5/2003 | Smethers |
| 6,563,514 B1 | 5/2003 | Samar |
| 6,571,253 B1 | 5/2003 | Thompson et al. |
| 6,578,144 B1 | 6/2003 | Gennaro et al. |
| 6,581,061 B2 | 6/2003 | Graham |
| 6,584,548 B1 | 6/2003 | Bourne et al. |
| 6,585,778 B1 | 7/2003 | Hind et al. |
| 6,589,290 B1 | 7/2003 | Maxwell et al. |
| 6,598,219 B1 | 7/2003 | Lau |
| 6,603,489 B1 | 8/2003 | Edlund et al. |
| 6,604,099 B1 | 8/2003 | Chung et al. |
| 6,606,606 B2 | 8/2003 | Starr |
| 6,609,200 B2 | 8/2003 | Anderson et al. |
| 6,611,822 B1 | 8/2003 | Beams et al. |
| 6,611,840 B1 | 8/2003 | Baer et al. |
| 6,613,098 B1 | 9/2003 | Sorge et al. |
| 6,615,276 B1 | 9/2003 | Mastrianni et al. |
| 6,629,109 B1 | 9/2003 | Koshisaka |
| 6,631,357 B1 | 10/2003 | Perkowski |
| 6,631,379 B2 | 10/2003 | Cox |
| 6,631,497 B1 | 10/2003 | Jamshidi et al. |
| 6,631,519 B1 | 10/2003 | Nicholson et al. |
| 6,632,251 B1 | 10/2003 | Rutten et al. |
| 6,635,089 B1 | 10/2003 | Burkett et al. |
| 6,636,845 B2 | 10/2003 | Chau et al. |
| 6,643,633 B2 | 11/2003 | Chau et al. |
| 6,643,652 B2 | 11/2003 | Helgeson et al. |
| 6,643,684 B1 | 11/2003 | Malkin et al. |
| 6,651,217 B1 | 11/2003 | Kennedy et al. |
| 6,654,737 B1 | 11/2003 | Nunez |
| 6,654,932 B1 | 11/2003 | Bahrs et al. |
| 6,658,417 B1 | 12/2003 | Stakutis et al. |
| 6,658,622 B1 | 12/2003 | Aiken et al. |
| 6,668,369 B1 | 12/2003 | Krebs et al. |
| 6,675,202 B1 | 1/2004 | Perttunen |
| 6,678,717 B1 | 1/2004 | Schneider |
| 6,691,230 B1 | 2/2004 | Bardon |
| 6,691,281 B1 | 2/2004 | Sorge et al. |
| 6,697,944 B1 | 2/2004 | Jones et al. |
| 6,701,434 B1 | 3/2004 | Rohatgi |
| 6,701,486 B1 | 3/2004 | Weber et al. |
| 6,704,906 B1 | 3/2004 | Yankovich et al. |
| 6,711,679 B1 | 3/2004 | Guski et al. |
| 6,720,985 B1 | 4/2004 | Silverbrook et al. |
| 6,725,426 B1 | 4/2004 | Pavlov |
| 6,735,721 B1 | 5/2004 | Morrow et al. |
| 6,748,385 B1 | 6/2004 | Rodkin et al. |
| 6,751,777 B2 | 6/2004 | Bates et al. |
| 6,754,874 B1 | 6/2004 | Richman |
| 6,757,868 B1 | 6/2004 | Glaser et al. |
| 6,760,723 B2 | 7/2004 | Oshinsky et al. |
| 6,763,343 B1 | 7/2004 | Brooke et al. |
| 6,772,139 B1 | 8/2004 | Smith, III |
| 6,772,165 B2 | 8/2004 | O'Carroll |
| 6,774,926 B1 | 8/2004 | Ellis et al. |
| 6,779,154 B1 | 8/2004 | Nussbaum et al. |
| 6,781,609 B1 | 8/2004 | Barker et al. |

| | | | | | | |
|---|---|---|---|---|---|---|
| 6,799,299 B1 | 9/2004 | Li et al. | | 2002/0156846 A1 | 10/2002 | Rawat et al. |
| 6,801,929 B1 | 10/2004 | Donoho et al. | | 2002/0156929 A1 | 10/2002 | Hekmatpour |
| 6,816,849 B1 | 11/2004 | Halt, Jr. | | 2002/0169789 A1 | 11/2002 | Kutay et al. |
| 6,845,380 B2 | 1/2005 | Su et al. | | 2002/0174147 A1 | 11/2002 | Wang et al. |
| 6,845,499 B2 | 1/2005 | Srivastava et al. | | 2002/0174417 A1 | 11/2002 | Sijacic et al. |
| 6,848,078 B1 | 1/2005 | Birsan et al. | | 2002/0184219 A1 | 12/2002 | Preisig et al. |
| 6,871,220 B1 | 3/2005 | Rajan et al. | | 2002/0188597 A1 | 12/2002 | Kern et al. |
| 6,874,130 B1 | 3/2005 | Baweja et al. | | 2002/0188613 A1 | 12/2002 | Chakraborty et al. |
| 6,876,996 B2 | 4/2005 | Czajkowski et al. | | 2002/0194219 A1 | 12/2002 | Bradley et al. |
| 6,889,359 B1 | 5/2005 | Conner et al. | | 2002/0196281 A1 | 12/2002 | Audleman et al. |
| 6,901,403 B1 | 5/2005 | Bata et al. | | 2002/0196288 A1 | 12/2002 | Emrani |
| 6,915,454 B1 | 7/2005 | Moore et al. | | 2002/0198891 A1 | 12/2002 | Li et al. |
| 6,931,532 B1 | 8/2005 | Davis et al. | | 2002/0198935 A1 | 12/2002 | Crandall, Sr. et al. |
| 6,941,510 B1 | 9/2005 | Ozzie et al. | | 2003/0004951 A1 | 1/2003 | Chokshi |
| 6,941,511 B1 | 9/2005 | Hind et al. | | 2003/0007000 A1 | 1/2003 | Carlson et al. |
| 6,941,521 B2 | 9/2005 | Lin et al. | | 2003/0014397 A1 | 1/2003 | Chau et al. |
| 6,948,133 B2 | 9/2005 | Haley | | 2003/0018668 A1 | 1/2003 | Britton et al. |
| 6,948,135 B1 | 9/2005 | Ruthfield et al. | | 2003/0020746 A1 | 1/2003 | Chen et al. |
| 6,950,980 B1 | 9/2005 | Malcolm | | 2003/0023641 A1 | 1/2003 | Gorman et al. |
| 6,961,897 B1 | 11/2005 | Peel, Jr. et al. | | 2003/0025732 A1 | 2/2003 | Prichard |
| 6,963,875 B2 | 11/2005 | Moore et al. | | 2003/0037303 A1 | 2/2003 | Bodlaender et al. |
| 6,968,503 B1 | 11/2005 | Chang et al. | | 2003/0043986 A1 | 3/2003 | Creamer et al. |
| 6,968,505 B1 | 11/2005 | Stoll et al. | | 2003/0046665 A1 | 3/2003 | Ilin |
| 6,993,714 B2 | 1/2006 | Kaler et al. | | 2003/0048301 A1 | 3/2003 | Menninger |
| 6,996,776 B1 | 2/2006 | Makely et al. | | 2003/0051243 A1 | 3/2003 | Lemmons et al. |
| 6,996,781 B1 | 2/2006 | Myers et al. | | 2003/0055828 A1 | 3/2003 | Koch et al. |
| 7,003,722 B2 | 2/2006 | Rothchiller et al. | | 2003/0056198 A1 | 3/2003 | Al-Azzawe et al. |
| 7,024,417 B1 | 4/2006 | Russakovsky et al. | | 2003/0061386 A1 | 3/2003 | Brown |
| 7,032,170 B2 | 4/2006 | Poulose et al. | | 2003/0061567 A1 | 3/2003 | Brown et al. |
| 7,036,072 B1 | 4/2006 | Sulistio et al. | | 2003/0084424 A1 | 5/2003 | Reddy et al. |
| 7,039,875 B2 | 5/2006 | Khalfay et al. | | 2003/0120578 A1 | 6/2003 | Newman |
| 7,051,273 B1 | 5/2006 | Holt et al. | | 2003/0120651 A1 | 6/2003 | Bernstein et al. |
| 7,058,663 B2 | 6/2006 | Johnston et al. | | 2003/0120659 A1 | 6/2003 | Sridhar |
| 7,062,764 B2 | 6/2006 | Cohen et al. | | 2003/0120671 A1 | 6/2003 | Kim et al. |
| 7,065,493 B1 | 6/2006 | Homsi | | 2003/0120686 A1 | 6/2003 | Kim et al. |
| 7,080,325 B2 | 7/2006 | Treibach-Heck et al. | | 2003/0126555 A1 | 7/2003 | Aggarwal et al. |
| 7,086,009 B2 | 8/2006 | Resnick et al. | | 2003/0128196 A1 | 7/2003 | Lapstun et al. |
| 7,088,374 B2 | 8/2006 | David et al. | | 2003/0135825 A1 | 7/2003 | Gertner et al. |
| 7,103,611 B2 | 9/2006 | Murthy et al. | | 2003/0140132 A1 | 7/2003 | Champagne et al. |
| 7,106,888 B1 | 9/2006 | Silverbrook et al. | | 2003/0158897 A1 | 8/2003 | Ben-Natan et al. |
| 7,107,282 B1 | 9/2006 | Yalamanchi | | 2003/0167277 A1 | 9/2003 | Hejlsberg et al. |
| 7,107,521 B2 | 9/2006 | Santos | | 2003/0182268 A1 | 9/2003 | Lal |
| 7,152,205 B2 | 12/2006 | Day et al. | | 2003/0182327 A1 | 9/2003 | Ramanujam et al. |
| 7,190,376 B1 | 3/2007 | Tonisson | | 2003/0187756 A1 | 10/2003 | Klivington et al. |
| 7,191,394 B1 | 3/2007 | Ardeleanu et al. | | 2003/0187930 A1 | 10/2003 | Ghaffar et al. |
| 2001/0007109 A1 | 7/2001 | Lange | | 2003/0188260 A1 | 10/2003 | Jensen et al. |
| 2001/0022592 A1 | 9/2001 | Alimpich et al. | | 2003/0189593 A1 | 10/2003 | Yarvin |
| 2001/0024195 A1 | 9/2001 | Hayakawa | | 2003/0192008 A1 | 10/2003 | Lee |
| 2001/0037345 A1 | 11/2001 | Kiernan et al. | | 2003/0204511 A1 | 10/2003 | Brundage |
| 2001/0054004 A1 | 12/2001 | Powers | | 2003/0204814 A1 | 10/2003 | Elo et al. |
| 2001/0056429 A1 | 12/2001 | Moore et al. | | 2003/0205615 A1 | 11/2003 | Marappan |
| 2001/0056460 A1 | 12/2001 | Sahota et al. | | 2003/0212664 A1 | 11/2003 | Breining et al. |
| 2002/0010743 A1 | 1/2002 | Ryan et al. | | 2003/0225469 A1 | 12/2003 | DeRemer et al. |
| 2002/0010746 A1 | 1/2002 | Jilk, Jr. et al. | | 2003/0225768 A1 | 12/2003 | Chaudhuri |
| 2002/0013788 A1 | 1/2002 | Pennell et al. | | 2003/0225829 A1 | 12/2003 | Pena et al. |
| 2002/0026441 A1 | 2/2002 | Kutay et al. | | 2003/0226132 A1 | 12/2003 | Tondreau et al. |
| 2002/0026461 A1 | 2/2002 | Kutay et al. | | 2003/0233374 A1 | 12/2003 | Spinola et al. |
| 2002/0032590 A1 | 3/2002 | Anand et al. | | 2003/0236859 A1 | 12/2003 | Vaschillo et al. |
| 2002/0032706 A1 | 3/2002 | Perla et al. | | 2003/0237046 A1 | 12/2003 | Parker et al. |
| 2002/0032768 A1 | 3/2002 | Voskuil | | 2003/0237047 A1 | 12/2003 | Borson |
| 2002/0035579 A1 | 3/2002 | Wang et al. | | 2004/0002939 A1 | 1/2004 | Arora |
| 2002/0035581 A1 | 3/2002 | Reynar et al. | | 2004/0003031 A1 | 1/2004 | Brown et al. |
| 2002/0040469 A1 | 4/2002 | Pramberger | | 2004/0003353 A1 | 1/2004 | Rivera et al. |
| 2002/0057297 A1 | 5/2002 | Grimes et al. | | 2004/0003389 A1* | 1/2004 | Reynar et al. ............... 717/178 |
| 2002/0070973 A1 | 6/2002 | Croley | | 2004/0010752 A1 | 1/2004 | Chan et al. |
| 2002/0078074 A1 | 6/2002 | Cho et al. | | 2004/0024842 A1 | 2/2004 | Witt |
| 2002/0078103 A1 | 6/2002 | Gorman et al. | | 2004/0030991 A1 | 2/2004 | Hepworth et al. |
| 2002/0100027 A1 | 7/2002 | Binding et al. | | 2004/0039990 A1 | 2/2004 | Bakar et al. |
| 2002/0112224 A1 | 8/2002 | Cox | | 2004/0044961 A1 | 3/2004 | Pesenson |
| 2002/0129056 A1 | 9/2002 | Conant | | 2004/0044965 A1 | 3/2004 | Toyama et al. |
| 2002/0133484 A1 | 9/2002 | Chau et al. | | 2004/0059754 A1 | 3/2004 | Barghout et al. |
| 2002/0152244 A1 | 10/2002 | Dean et al. | | 2004/0073565 A1 | 4/2004 | Kaufman et al. |
| 2002/0156772 A1 | 10/2002 | Chau et al. | | 2004/0073868 A1 | 4/2004 | Easter et al. |

| | | |
|---|---|---|
| 2004/0078756 A1 | 4/2004 | Napper et al. |
| 2004/0083426 A1 | 4/2004 | Sahu |
| 2004/0088647 A1* | 5/2004 | Miller et al. ............... 715/500 |
| 2004/0093596 A1 | 5/2004 | Koyano |
| 2004/0107367 A1 | 6/2004 | Kisters |
| 2004/0117769 A1 | 6/2004 | Lauzon et al. |
| 2004/0123277 A1 | 6/2004 | Schrader et al. |
| 2004/0146199 A1 | 7/2004 | Berkner et al. |
| 2004/0163041 A1 | 8/2004 | Engel |
| 2004/0172442 A1 | 9/2004 | Ripley |
| 2004/0186762 A1 | 9/2004 | Beaven et al. |
| 2004/0189716 A1 | 9/2004 | Paoli et al. |
| 2004/0194035 A1 | 9/2004 | Chakraborty |
| 2004/0205473 A1 | 10/2004 | Fisher et al. |
| 2004/0205525 A1 | 10/2004 | Murren et al. |
| 2004/0205534 A1 | 10/2004 | Koelle |
| 2004/0205571 A1 | 10/2004 | Adler |
| 2004/0205592 A1 | 10/2004 | Huang |
| 2004/0205605 A1 | 10/2004 | Adler et al. |
| 2004/0205653 A1 | 10/2004 | Hadfield et al. |
| 2004/0205671 A1 | 10/2004 | Sukehiro et al. |
| 2004/0221238 A1 | 11/2004 | Cifra et al. |
| 2004/0221245 A1 | 11/2004 | Chickles et al. |
| 2004/0237030 A1 | 11/2004 | Malkin |
| 2004/0268229 A1 | 12/2004 | Paoli et al. |
| 2005/0004893 A1 | 1/2005 | Sangroniz |
| 2005/0005248 A1 | 1/2005 | Rockey et al. |
| 2005/0015732 A1 | 1/2005 | Vedula et al. |
| 2005/0027757 A1 | 2/2005 | Klessig et al. |
| 2005/0038711 A1 | 2/2005 | Marlelo |
| 2005/0055627 A1 | 3/2005 | Lloyd et al. |
| 2005/0060324 A1 | 3/2005 | Johnson et al. |
| 2005/0065933 A1 | 3/2005 | Goering |
| 2005/0065936 A1 | 3/2005 | Goering |
| 2005/0066287 A1 | 3/2005 | Tattrie et al. |
| 2005/0071752 A1 | 3/2005 | Marlatt |
| 2005/0076049 A1 | 4/2005 | Qubti et al. |
| 2005/0091285 A1 | 4/2005 | Krishnan et al. |
| 2005/0091305 A1 | 4/2005 | Lange et al. |
| 2005/0102370 A1 | 5/2005 | Lin et al. |
| 2005/0108624 A1 | 5/2005 | Carrier |
| 2005/0114757 A1 | 5/2005 | Sahota et al. |
| 2005/0138086 A1 | 6/2005 | Pecht-Seibert |
| 2005/0171746 A1 | 8/2005 | Thalhammer-Reyero |
| 2005/0198086 A1 | 9/2005 | Moore |
| 2005/0198247 A1 | 9/2005 | Perry et al. |
| 2005/0223063 A1 | 10/2005 | Chang et al. |
| 2005/0223320 A1 | 10/2005 | Brintzenhofe et al. |
| 2005/0268222 A1 | 12/2005 | Cheng |
| 2006/0020586 A1 | 1/2006 | Prompt et al. |
| 2006/0026534 A1 | 2/2006 | Ruthfield et al. |
| 2006/0031757 A9 | 2/2006 | Vincent, III |
| 2006/0036995 A1 | 2/2006 | Chickles et al. |
| 2006/0041838 A1 | 2/2006 | Khan |
| 2006/0059434 A1 | 3/2006 | Boss et al. |
| 2006/0069605 A1 | 3/2006 | Hatoun |
| 2006/0085409 A1 | 4/2006 | Rys et al. |
| 2006/0143220 A1 | 6/2006 | Spencer, Jr. |
| 2007/0036433 A1 | 2/2007 | Teutsch |
| 2007/0050719 A1 | 3/2007 | Lui et al. |
| 2007/0061467 A1 | 3/2007 | Essey |
| 2007/0061706 A1 | 3/2007 | Cupala |
| 2007/0074106 A1 | 3/2007 | Ardeleanu |
| 2007/0094589 A1 | 4/2007 | Paoli |
| 2007/0100877 A1 | 5/2007 | Paoli |
| 2007/0101280 A1 | 5/2007 | Paoli |

FOREIGN PATENT DOCUMENTS

| | | |
|---|---|---|
| EP | 0 961 197 | 12/1999 |
| EP | 1 076 290 A2 | 2/2001 |
| EP | 1221661 | 7/2002 |
| JP | 63085960 | 4/1988 |
| JP | 401173140 | 7/1989 |
| JP | 3191429 | 8/1991 |
| JP | 4225466 | 8/1992 |
| JP | 5314152 | 11/1993 |
| JP | 406014105 | 1/1994 |
| JP | 6139241 | 5/1994 |
| JP | 6180697 | 6/1994 |
| JP | 6180698 | 6/1994 |
| JP | 2000132436 | 5/2000 |
| JP | 2002183652 | 6/2002 |
| JP | 2003173288 | 6/2003 |
| WO | WO 99/24945 | 5/1999 |
| WO | WO 99/56207 | 11/1999 |
| WO | WO 01/44934 A1 | 6/2001 |
| WO | WO0157720 | 9/2006 |

OTHER PUBLICATIONS

Van Hoff, Arthur et al., "The Open Software Description Format," Online, Aug. 13, 1997, retrieved from the Internet on Nov. 7, 2003: <http://www.w3.org/TR/NOTE-OSD>, 11 pages.

Netscape Communications Corp., "SmartUpdate Developer's Guide," Online, Mar. 11, 1999, retrieved from the Internet on Dec. 8, 2000: <http://developer.netscape.com:80/docs/manuals/communicator/jarman/index.htm>, 83 pages.

Dayton, Linnea and Jack Davis, "Photo Shop 5/5.5 WOW! Book," 2000, Peachpit Press, pp. 8-17.

Williams, Sara and Charlie Kindel, "The Component Object Model: A Technical Overview," Oct. 1994, Microsoft Corp., pp. 1-14.

Varlamis, Iraklis et al., "Bridging XML-Schema and relational databases. A system for generating and manipulating relational databases using valid XML documents," DocEng '01, Nov. 9-10, 2001, Copyright 2001, ACM 1-58113-432-0/01/0011, pp. 105-114.

Hardy, Matthew R. B. et al., "Mapping and Displaying Structural Transformations between XML and PDF," DocEng '02, Nov. 8-9, 2002, Copyright 2002, ACM 1-58113-594-7/02/0011, pp. 95-102.

Kim, Sang-Kyun et al., "Immediate and Partial Validation Mechanism for the Conflict Resolution of Update Operations in XML Databases," WAIM 2002, LNCS 2419, 2002, pp. 387-396, Springer-Verlag Berlin Heidelberg 2002.

Chuang, Tyng-Ruey, "Generic Validation of Structural Content with Parametric Modules," ICFP '01, Sep. 3-5, 2001, Copyright 2001, ACM 1-58113-415-0/01/0009, pp. 98-109.

Chen, Ya Bing et al., "Designing Valid XML Views," ER 2002, LNCS 2503, 2002, Springer-Verlag Berlin Heidelberg 2002, pp. 463-477.

Chen, Yi et al., "XKvalidator: A Constraint Validator for XML," CIKM '02, Nov. 4-9, 2002, Copyright 2002, ACM 1-58113-492-4/02/0011, pp. 446-452.

Brogden, William, "Arbortext Adept 8 Editor Review," O'Reilly XML.COM, 'Online! Sep. 22, 1999) XP002230080, retrieved from the Internet <URL:http://www.xml.com/pub/a/1999/09/adept/AdeptRvw.htm>, retrieved on Feb. 5, 2003.

Alschuler, Liora, "A tour of XMetal" O'Reilly XML.COM, 'Online! Jul. 14, 1999, XP002230081, retrieved from the Internet: <URL:http://www.xml.com/pub/a/SeyboldReport/ip031102.html>, retrieved on Feb. 5, 2003.

Davidow, Ari, "XML Editors: Allegations of Functionality in search of reality," INTERNET,' Online! 1999, XP002230082, retrieved from the Internet, <URL:http://www.ivritype.com/xml/>.

Battle, Steven A. et al., "Flexible Information Presentation with XML", 1998, The Institution of Electrical Engineers, 6 pages.

Ciancarini, Paolo et al., "Managing Complex Documents Over the WWW: A Case Study for XML", IEEE Transactions on Knowledge and Data Engineering, vol. 11, No. 4, Jul./Aug. 1999, pp. 629-638.

Kanemoto, Hirotaka et al., "An Efficiently Updatable Index Scheme for Structured Documents", 1998 IEEE, pp. 991-996.

Usdin, Tommie et al., "XML: Not a Silver Bullet, But a Great Pipe Wrench", Standardview vol. 6, No. 3, Sep. 1998, pp. 125-132.

Sutanthavibul, Supoj et al., "XFIG Version 3.2 Patchlevel 2(Jul. 2, 1998) Users Manual (Edition 1.0)", Internet Document, [Online]

Jul. 2, 1998, XP002229137 Retrieved from the Internet: <URL:http://www.ice.mtu.edu/online_docs/xfig332/> [retrieved on Jan. 28, 2003].

"Architecture for a Dynamic Information Area Control", IBM Technical Disclosure Bulletin, IBM Corp. New York, US, vol. 37, No. 10, Jan. 10, 1994, pp. 245-246.

Au, Irene et al., "Netscape Communicator's Collapsible Toolbars," CHI '98, Human Factors in Computing Systems, Conference Proceedings, Los Angeles, CA, Apr. 18-23, 1998, pp. 81-86.

Netscape Communication Corporation: "Netscape Communicator 4.61 for OS/2 Warp" Software, 1999, The whole software release & "Netscape—Version 4.61 [en]—010615" Netscape Screenshot, Oct. 2, 2002.

Rogge, Boris et al., "Validating MPEG-21 Encapsulated Functional Metadata," IEEE 2002, pp. 209-212.

Neslon, Mark, "Validation with MSXML and XML Schema," Windows Developer Magazine, Jan. 2002. pp. 35-38.

Chien, Shu-Yao et al., "XML Document Versioning," SIGMOD Record, vol. 30, No. 3, Sep. 2001, pp. 46-53.

Wong, Raymond K. et al., "Managing and Querying Multi-Version XML Data with Update Logging," DocEng '02, Nov. 8-9, 2002, Copyright 2002, ACM 1-58113-594-7/02/0011, pp. 74-81.

Chien, Shu-Yao et al., "Efficient schemes for managing multiversionXML documents", VLDB Journal (2002), pp. 332-353.

Chien, Shu-Yao et al., "Efficient Management of Multiversion Documents by Object Referencing," Proceedings of the 27th VLDB Conference, 2001, pp. 291-300.

Chien, Shu-Yao et al., "Storing and Querying Multiversion XML Documents using Durable Node Numbers," IEEE 2002, pp. 232-241.

Dyck, Timothy, "XML Spy Tops as XML Editor," http://www.eweek.com/article2/0,3959,724041,00.asp, Nov. 25, 2002, 4 pages.

"Netscape window" Netscape Screenshot, Oct. 2, 2002.

Haukeland, Jan-Henrick, "Tsbiff—tildeslash biff—version 1.2.1" Internet Document, [Online] Jun. 1999, URL:http://web.archive.org/web/19990912001527/http://www.tildeslash.com/tsbiff/.

"Enter Key", Retrieved from the Internet at http://systems.webopedia.com/TERM/Enter_key.html on Dec. 20, 2006.

"Microsoft Visual Basic 5.0 Programmer's Guide", *Microsoft Press*, (1997), pp. 42-43, 54-58.

"Microsoft Word 2000", Screenshots,(1999),1-5.

Beauchemin, Dave, "Using InfoPath to Create Smart Forms", Retrieved from the Internet at http:/www.microsoft.com/office/infopath/prodinfo/using.mspx on Jan. 21, 2007,(Mar. 27, 2003).

Begun, Andrew, et al., "Support and Troubleshooting for XML Schemas in InfoPath 2003", *Microsoft Office InfoPath 2003 Technical Articles*, Retrieved from the Internet at http://msdn2.microsoft.com/en-us/library/aa168241(office.11,d=printer).aspx on Jan. 21, 2007,(Aug. 2004).

Borland, Russo, "Running Microsoft Word 97", 314-315, 338, 361-362, 390, and 714-719.

Brabrand, et al., "Power Forms Declarative Client-side Form Field Validation", (2002), 1-20.

Dubinko, Micah, "XForms and Microsoft InfoPath", Retrieved from the Internet at http://www.xml.com/lpt/a/1311 on Jan. 21, 2007,(Oct. 29, 2003).

Hoffman, Michael, "Architecture of Microsoft Office InfoPath 2003", *Microsoft Office InfoPath 2003 Technical Articles*, Retrieved from the Internet at http://msdn2.microsoft.com/en-us/library/aa219024(office.11,d=printer).aspx on Jan. 21, 2007.(Jun. 2003).

Lehtonen, Miro , et al., "A Dynamic User Interface for Document Assembly", Department of Computer Science, University of Helsinki,(Nov. 2002).

Nelson, Joe , "Client-side Form Validation Using JavaScript", *Developer Advisory*, (Sep. 21, 2001).

Raman, T. V., et al., "XForms 1.0", (Dec. 2001),Section 1-12.2.3 & Appendices A-G.

Rees, Michael J., "Evolving the Browser Towards a Standard User Interface Architecture", School of Information Technology, Bond University, Australia,(2001).

Singh, Darshan, "Microsoft InfoPath 2003 By Example", Retrieved from the Internet at http://www.perfectxml.com/InfoPath.asp on Jan. 21, 2007,(Apr. 20, 2003).

Udell, Jon, "InfoPath and XForms", Retrieved from the Internet at http://weblog.infoworld.com/udell/2003/02/26.html,(Feb. 26, 2003).

Clark, James, Ed.; "XSL Transformation (XSLT) Version 1.0," Nov. 16, 1999, W3C (MIT, INRIA, Keio), pp. 1-156.

Clark, James and Steve Derose, "XML Path Language (XPath) Version 1.0," Nov. 16, 1999, W3C (MIT, INRIA, Keio), pp. 1-49.

Musgrave, S., "Networking technology—impact and opportunities," Survey and Statistical Computing 1996. Proceedings of the Second ASC International Conference. Sep. 1996. pp. 369-378. London, UK.

Rapaport, L., "Get more from SharePoint," Transform Magazine, vol. 11, No. 3, Mar. 2002, pp. 13, 15.

McCright, J.S., "New Tool Kit to Link Groove with Microsoft SharePoint," eWeek, Enterprise News & Reviews, Ziff Davis Media Inc., Jul. 29, 2002, 1 page.

U.S. Appl. No. 60/209,713, filed Jun. 5, 2000.

Noore A.; "A secure conditional access system using digital signature and encryption" 2003 Digest of Technical Papers. International Conference on Consumer Electronics Jun. 2003 pp. 220-221.

Komatsu N. et al.; "A proposal on digital watermark in document image communication and its application to realizing a signature" Electronics and Communications in Japan.

Sun Q. et al.; "A robust and secure media signature scheme for JPEG images" Proceedings of 2002 IEEE Workshop on Multimedia Signal Processing Dec. 2002 pp. 296-299.

Whitehill; "Whitehill Composer" Whitehill Technologies Inc. 2 pages.

Pacheco et al.; "Delphi 5 Developer's Guide" Sams Publishing 1999 Chapter 31 Section: Data Streaming 6 pages.

Clarke; "From small beginnings"; Knowledge Management, Nov. 2001; www.bl.uk; 2 pages.

Hwang, et al; "Micro-Firewalls for Dynamic Network Security with Distributed Intrusion Detection"; IEEE International Symposium on Network Computing and Applications; 2001; pp. 68-79.

Schmid, et al; "Protecting Data from Malicious Software"; 18th Annual Computer Security Applications Conference; 2002; pp. 199-208.

Kaiya, et al; "Specifying Runtime Environments and Functionalities of Downloadable Components Under the Sandbox Model"; International Symposium on Principles of Softwre Evolution; 2000; pp. 138-142.

Prevelakis, et al; "Sandboxing Applications"; Proceedings of the FREENIX Track; 2001; pp. 119-126.

Tomimori, et al; "An Efficient and Flexible Access Control Framework for Java Programs in Mobile Terminals"; 22nd International Conference on Distributed Computing Systems Workshops; 2002; pp. 777-782.

U.S. Appl. No. 60/191,662, Kutay et al.

U.S. Appl. No. 60/203,081, Ben-Natan et al.

"Store and Organize Related Project Files in a Binder," Getting Results with Microsoft Office, 1990, pp. 109-112.

Barker et al., "Creating In-Line Objects Within An Integrated Editing Environment," IBM Technical Disclosure Bulletin, vol. 27, No. 5, Oct. 1984, p. 2962.

Berg A., "Naming and Binding: Monikers" Inside OLE, 1995, Chapter 9, pp. 431-490.

Clapp D., "The NeXT Application Kit Part I: Non-Responsive Classes," The NeXT Bible 1990, Chapter 16, pp. 275-293.

DiLascia et al., "Sweeper" Microsoft Interactive Developer, vol. 1, No. 1, 1996, 27 pages.

Herzner et al., "CDAM- Compound Document Access and Management. An Object-Oriented Approach" Multimedia Systems Interaction and Applications, 1992, Chapter 3, pp. 17-36.

Kobayashi et al., "An Update on BTRON-specification OS Development" IEEE 1991 pp. 132-140.

Peterson B. , "Unix Variants," Unix Review, vol. 10, No. 4, Apr. 1992, pp. 29-31.

Pike et al., "Plan 9 from Bell Labs" UKUUG, Summer 1990, 10 pages.

Pike et al., "The Use of Name Spaces in Plan 9," Operating Systems Review vol. 27, No. 2, Apr. 1993, pp. 72-76.

Staneck W., "Internal and External Media" Electronic Publishing Unleashed, 1995, Chapter 22, pp. 510-542.

Zdonik S., "Object Management System Concepts," ACM 1984, pp. 13-19.

Trupin J., "The Visual Programmer," Microsoft Systems Journal, Apr. 1996, pp. 103-105.

OMG XML Metadata Interchange (XMI) Specification Version 1.2 Jan. 2002.

IBM: Stack Algorithm for Extractin Subtree from Serialized Tree, Mar. 1, 1994, TDB-ACC-NONN94033, 3 pages.

Laura Acklem & Read Gilgen, "Using Corel Wordperfect 9", 251-284, 424-434, 583-586 (1998).

Bruce Halberg et al, "Using Microsoft Excel 97", Published 1997, Bestseller Edition, Pertinent pp. 1-9, 18-25, 85-89, 98-101, 106-113, 124-127, 144-147, 190-201, 209-210, 218-227, 581-590, 632-633, 650-655, 712-714.

Leblond et al, "PC Magazine Guide to Quattro Pro for Windows", pp. 9-11, 42-61, Ziff-Davis Press, Copyright 1993 by the LeBlond Group.

Mansfield, "Excel 97 for Busy People", Published by Osborne/Mcgraw-Hill 1997 pp. 48-50.

"Microsoft Visual Basic 5.0 Programmer's Guide 1997"; pp. 578-579; Redmond WA 98052-6399.

Han et al., WebSplitter: A Unified XML Framework for Multi-Device Collaborative Web Browsing, 2000, ACM Conference on Cimputer Supported Cooperative Work, 10 pages.

Atova, "User Reference manual Version 4.4, XML Spy suite 4.4," Atova Ges.m.b.H and Altova, Inc., May 24, 2002, pages cover, copyright p. 1-565.

Altova et al. XML Spy, XML integrated Development Environments, Altova Inc., 2002, pp. 1-18.

Ben-Natan, U.S. Appl. No. 60/203,081, filed May 9, 2000, entitled "Internet platform for creating and supporting communities".

Ixia Soft, "Steamlining content creation, retrieval, and publishing on the Web using TEXTML Server and SML Spy 4 Suite in an integrated, Web publishing environment," (Partner's Whitepaper, published on the Web as of Jun. 6, 2002, downloaded pp. 1-16.

Kutay, U.S. Appl. No. 60/209,713, filed Jun. 5, 2000, entitled, "Methods and Systems for accessing, organizing presenting and viewing data".

Microsoft Word 2000 (see Screen Shot "About Microsoft Word") Published 1983-1999 and Microsoft Excel 2000 (see Screen Shot "About Microsoft Excel") Published 1988-1999, Three pages.

Moore, U.S. Appl. No. 60/191,662, filed Mar. 23, 2000, entitled "Collection-based presistent digital archives".

Altova, Inc., "XML Spy 4.0 Manual," Altova Inc. & Altova GmbH, coyright 1998-2001, Chapters, 1, 2, and 6, encompassing pp. 1-17, 18-90, and 343-362.

Cybook, INC.: "Copying the Search Form to Services-based Web Sites" INternet Article, (online) Jul. 26, 2004. the whole document.

Excel Developer Tip (hereinafter "Excel"), "Determining the Data Type of a Cell", May 13, 1998, p. 1 (available at http://jwalk.com/ss//excel/tips/tip62.htm).

Macromedia, INC.: "Dreamweaver Technote, Changes in copying and pasting in Dreamweaver 4" Internet Article (online). the whole document.

Rado, Dave: "How to create a template that makes it easy for users to "fill in the blanks", without doing any programming" Microsoft Word MVP FAQ Site, (online) Apr. 30, 2004, the whole document.

Cover, XML Forms Architecture, retrieved at <<http://xml.coverpages.org/xfa.html>> on Aug. 17, 2006, Coverpages, Jun. 16, 1999.

Raggett, "HTML Tables", retrieved on Aug. 6, 2006, at <<http:www://is-edu.hcmuns.edu.vn/WebLib/books/Web/Tel/html3-tables.html>>, W3C Internet Draft, Jul. 7, 1995, pp. 1-12.

"Webopedia Computer Dictionary" retrieved on May 9, 2006, at <<http://www.pewebopedia.com/TERM/O/OLE.html>>, Jupitermedia Corporation, 2006, pp. 07.

Microsoft Corporation, "Microsoft Computer Dictionary" Microsoft Press, Fifth Edition, p. 149.

Anat, Eyal et al., "Integrating and Customizing Hererogeneous E-Commerce Applications", The VLDB Journal-The International Journal on Very Large Data Bases, vol. 10, Issue 1, (Aug. 2001), 16-38.

Adams, Susie et al., "BizTalk Unleashed", Sams publishing, 2002, first printing Mar. 2001, 1-2, 31-138.

Vasters, Clemens F., "BizTalk Server 2000 A Beginner's Guide", Osborne/McGraw-Hill,(2001), 1-2, 359-402.

Halberg, Bruce et al., "Using Microsoft Excel 97", (1997), 191-201, 213-219.

Villard, et al., "An Incremental XSLT Transformation Processor for XML Document Manipulation", http://www2002.org/CDROM/refereed/321, Printed on May 18, 2007,(May 2002),25 pages.

* cited by examiner

Purchase Order

Reference Number:
Priority: Normal
Date Ordered:
Charge To:
Date Required:

Submitted By

- Name:
- ID Number:
- E-mail Address:
- Telephone Number:
- Address Line 1:
- Address Line 2:
- City:
- State/Province:
- Postal Code:
- Country/Region:

Vendor Information

- Company Name:
- E-mail Address:
- Telephone Number:
- Fax Number:
- Web Site Address:
- Address Line 1:
- Address Line 2:
- City:
- State/Province:
- Postal Code:
- Country/Region:

*Fig. 2*

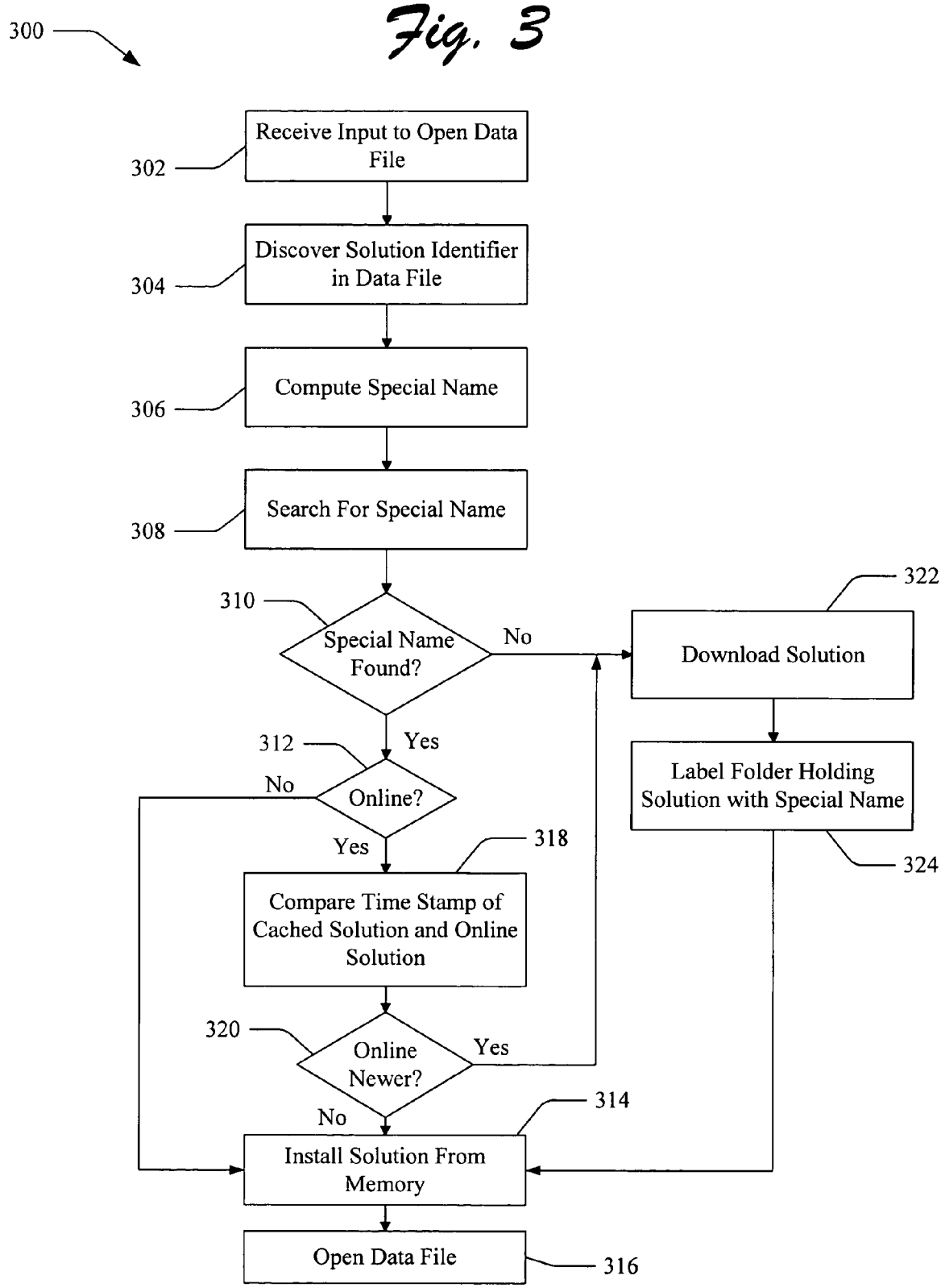

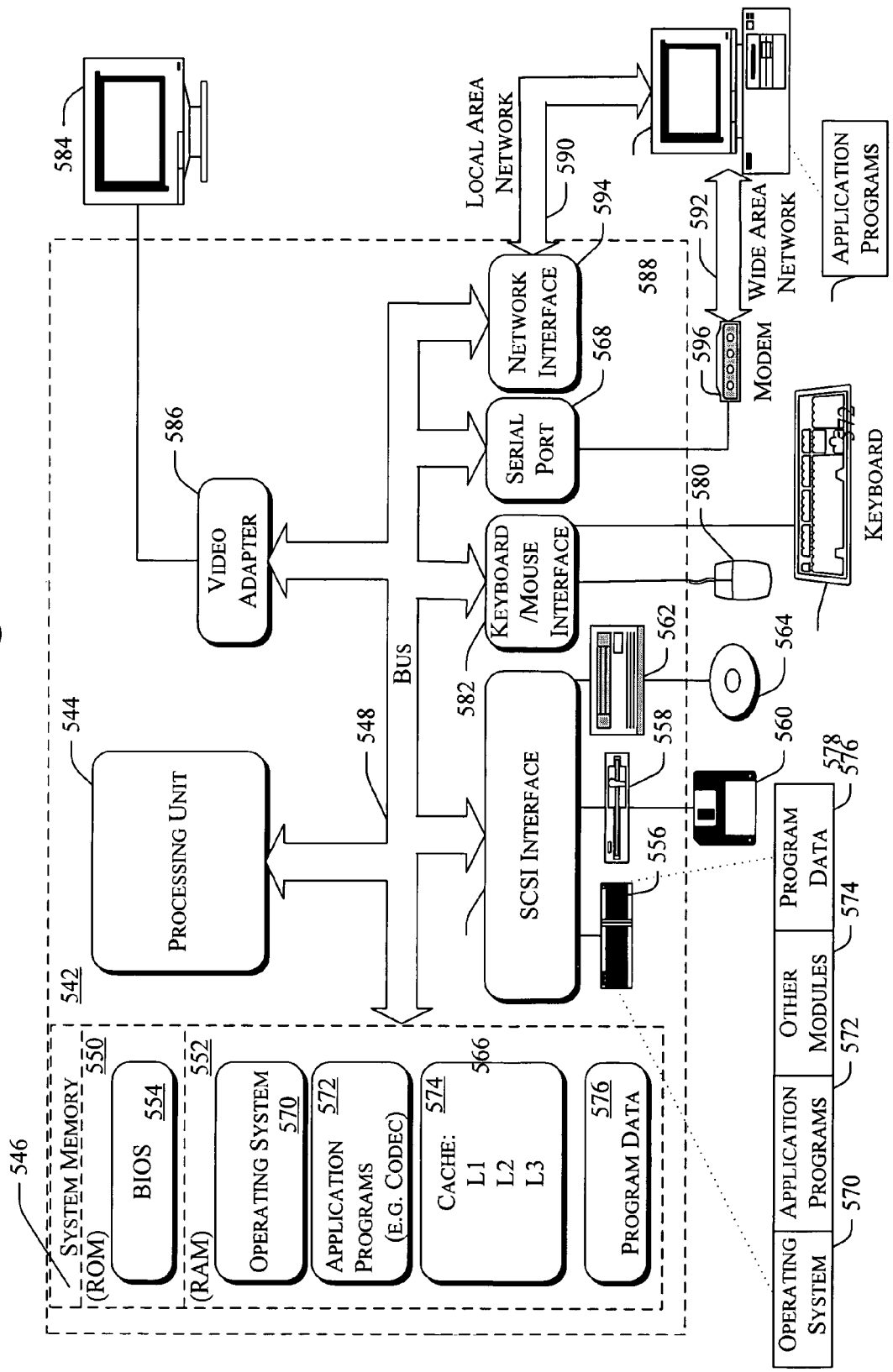

OFFLINE EDITING OF XML FILES USING A SOLUTION

RELATED APPLICATIONS

This application is a continuation-in-part of U.S. patent application Ser. No. 10/395,490, filed on Mar. 24, 2003, titled "System and Method for Offline Editing of Data Files", which is incorporated in its entirety by reference.

TECHNICAL FIELD

This invention generally relates to editing XML files while offline.

BACKGROUND

Extensible markup language (XML) is increasingly becoming the preferred format for transferring data. XML is a tag-based hierarchical language that is extremely rich in terms of the data that it can be used to represent. For example, XML can be used to represent data spanning the spectrum from semi-structured data (such as one would find in a word processing document) to generally structured data (such as that which is contained in a table). XML is well-suited for many types of communication including business-to-business and client-to-server communication. For more information on XML, XSLT, and XSD (schemas), the reader is referred to the following documents which are the work of, and available from, the W3C (World Wide Web consortium): XML Schema Part 2: Datatypes; XML Schema Part 1: Structures, and XSL Transformations (XSLT) Version 1.0; and XML 1.0 second edition specification.

One of the reasons that data files written in XML are often preferred for transferring data is that XML data files contain data, rather than a combination of data and the software application needed to edit the data. One problem with XML data files, however, is that to edit an XML data file, a user needs to first install a solution software application used to access, view, and edit the data file.

When a user is online, his computer can run a host application capable of accessing the Internet, such as Microsoft® Internet Explorer®, which can silently discover and deploy a solution that enables the user to author and access a corresponding XML data file.

If a user wishes to save an XML data file for later, offline use, however, the user may encounter various problems. In some cases, a user wishing to reopen an XML data file offline will not be able to do so because he can no longer discover and deploy the XML data file's solution application. The user can no longer discover a solution if he is no longer online and the solution is accessible only online. In other cases, a user can access and deploy the solution application, but to do so the user must proactively discover the solution's name and where on his computer it resides, which a user may not know. And sometimes, a user's host application discovers the solution's name and where it resides, but the user has to instruct his computer to deploy the solution application, rather than the computer automatically opening the solution file when the user attempts to open the corresponding XML data file.

Even in those cases where a user can continue to author and access an XML data file offline by actively installing the XML data file's solution application, there often is another problem. When a user instructs his host application to open a solution for an XML data file, his host application may trust the solution, thereby setting the user's computer at risk. A solution originally accessed online could, for instance, contain a virus or worm. When the user instructs his host application to install the solution, it could introduce the virus or worm.

Given the foregoing, it would be an advantage in the art to provide editing data files offline that is neither inconvenient nor dangerous.

SUMMARY

The following description and figures describe an offline editing tool enabling offline editing of an XML data file with silent discovery and deployment of the XML data file's solution. To discover the solution, a processing instruction (PI) in an XML data file is read to determine the solution's origin. The PI contains an entity that can be a href attribute that points to a URL, a name, a target that includes the character string that identifies an application used to create an HTML electronic form associated with the XML data file, or a href attribute and at least one of a PI version and a product version. This offline editing tool enables a user to edit XML data files by performing certain actions before the user attempts to edit the XML data file while offline. When a user first opens an XML data file when online, for instance, the editing tool can download the data file's solution into a cache for later retrieval.

The offline editing tool follows appropriate security precautions to contain possibly dangerous code in an XML data file's solution even when the solution is installed from a local source, such as when a user is offline. This offline editing tool determines what level of security is appropriate for an XML data file's solution based on the original source of the solution.

BRIEF DESCRIPTION OF THE DRAWINGS

The detailed description is described with reference to the accompanying figures in which the same numbers are used throughout the disclosure and figures to reference like components and features. Series 100 numbers refer to features originally found in FIG. 1, series 200 numbers refer to features originally found in FIG. 2, and series 300 numbers refer to features originally found in FIG. 3, and so on.

FIG. 2 illustrates an exemplary electronic form whereby a user can edit a data file.

FIG. 3 is a flow diagram of an exemplary process for editing of data files while online or offline.

FIG. 5 is a block diagram of a computer system that is capable of supporting secure online and offline editing of data files.

DETAILED DESCRIPTION

The following disclosure describes an easy, simple, and secure way to access data files when offline. If a user has opened a data file first online, or if the system has otherwise received the data file's solution, a document manager application can silently discover and deploy a data file's solution. The document manager allows a user to simply select a data file to open and the document manager will open the data file with a discovered and deployed solution. The user need not discover, select, or even be aware that the data file requires a solution for the data file to be edited. After selecting the data file to open, the user can then edit and access the data file in a way very similar to how it would act and appear had the user opened the data file while online.

Data Files, Solutions, and Host Applications

Data files, their solutions, and a host application work together to allow a user to open and edit the data file. Data files contain little or no operable code, whereas a solution file contains presentation and logic applications. Because editing a data file requires a solution, if a user tries to open a data file without a solution, she could get an error, a prompt asking the user to open a solution, or perhaps a flat list of the data in the data file.

To view and edit a data file then, the data file's solution is needed. A data file's solution application is one or more files that, when installed, are used to enable a user to view, access, and edit the data file.

In addition to the data file and its solution, a host application is needed. This application works to enable the solution to function fully. In this description, a document manager application is described, which is capable not only of acting as a host application (allowing a solution to function properly), but can also allow a user to open a data file without actively finding and installing the data file's solution.

For discussion purposes, the system and method described herein are described in the context of a single computer, a communications network, a user-input device, and a single display screen. These devices will be described first, followed by a discussion of the techniques in which these and other devices can be used.

Exemplary Architecture

Figure 1:
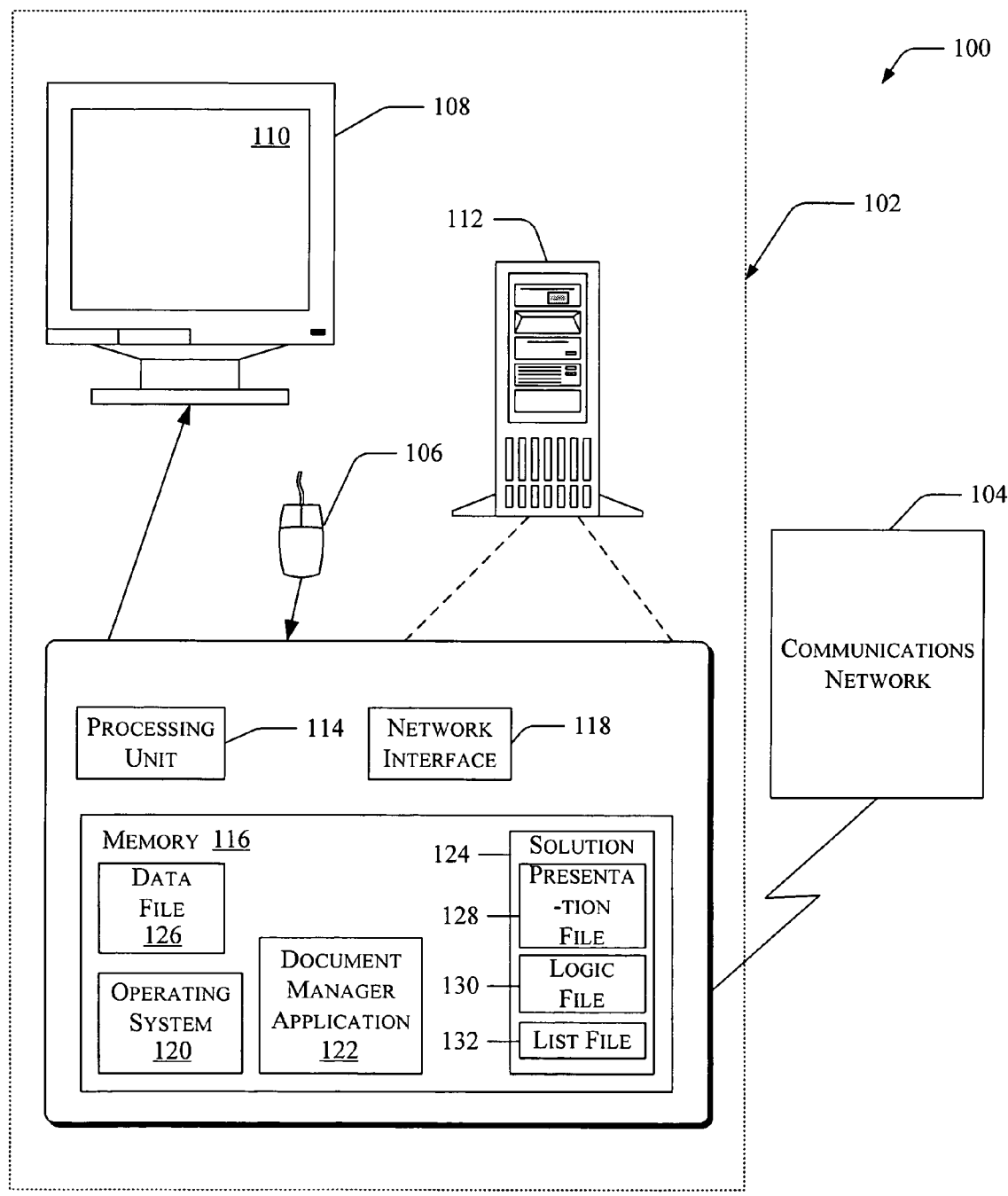
FIG. 1 illustrates a communications network and a system capable of implementing a method for offline editing of data files.

FIG. 1 shows an exemplary architecture 100 to facilitate online and offline editing of data files. This architecture 100 includes a computing system 102 connected to a communications network 104. The system 102 is configured to go online and communicate via the communications network 104 to gain access to non-local information sources, such as sources on an intranet or global network. Alternatively, the system 102 can remain offline, where it utilizes local resources without communicating over the communications network 104.

The computing system 102 includes a user-input device 106, a display 108 having a screen 110, and a computer 112. The user-input device 106 can include any device allowing a computer to receive a designer's preferences, such as a keyboard, a mouse, a touch screen, a voice-activated input device, a track ball, and the like. With the user-input device 106, a user can edit a data file by adding or deleting information within a data-entry field on an electronic form, for instance. The user can use the display 108 and its screen 110 to view the data files.

The computer 112 includes a processing unit 114 to execute applications, a memory 116 containing applications and files, and a network interface 118 to facilitate communication with the communications network 104. The memory 116 includes volatile and non-volatile memory, and applications, such as an operating system 120 and a document manager application 122. The memory 116 also includes a solution 124 for a data file 126. The solution 124 is located locally in the memory 116, but often has a different original source, such as a source on the communications network 104. The solution 124 contains one or more files, such as a presentation file 128, a logic file 130, and a list file 132, which will be discussed in greater detail below.

The document manager application 122 facilitates offline editing of the data files 126 and is executed by the processing unit 114. The document manager 122 is capable of acting as a host application and enabling a user to open the data file 126 without actively finding and installing the data file's solution 124. Without any user interaction, other than the user attempting to open the data file 126, the document manager 122 discovers and installs the data file's solution 124. Thus, the user does not have to do anything but request to open the data file 126. The user does not have to discover the data file's solution 124. The user does not have to install the data file's solution 124. This silent discovery and deployment allows the user to view, edit, and otherwise interact with the data file 126 with just a single request. In addition, the document manager 122 can provide security offline similar to the security that the user typically enjoys when running a solution online.

A view of the data file 126 is depicted on screen 110 through execution of the data file's solution 124. The solution 124 contains one or more applications and/or files that the document manager 122 uses to enable a user to edit the data file 126. To edit the data file 126 in a user-friendly way, the data file's solution 124 contains the presentation file 128, which includes an electronic form. This presentation file 128 gives the user a graphical, visual representation of data-entry fields showing previously entered data or blank data-entry fields into which the user can enter data. Data files often have one solution but each solution often governs multiple data files.

FIG. 2 shows an electronic form 200 entitled "Purchase Order", which is generated by the solution 124. This purchase order 200 contains data-entry fields in which a user can enter data. These data-entry fields map to the data file 126, so that the data entered into the form are retained in the data file 126.

This solution 124 presents an electronic form but also contains the logic file 130 that governs various aspects of the electronic form and the data file 126. In a reference number data-entry field 202, for instance, the solution 124 presents the data-entry field as a white box within a gray box, provides a description of the data desired with the text "Reference Number", and contains logic requiring that the user enter only numbers. Thus, if the user attempted to enter letters, the logic file 130 of the solution 124 would not permit the user's entry. The solution 124 could reject it and inform the user of the problem, such as with a sound, flashing error signal, pop-window, or the like.

The logic file 130 is employed in the solution 124 to ensure that the right kind of data is being entered and retained by the data file 126. A user's business manager attempting to reference purchases with a reference number, for instance, would like the solution 124 to have numbers in the reference number data-entry field 202; the manager may not be able to determine how an order should be handled if the reference number entered is incorrect because it contains letters.

Similarly, suppose a business manager wants the delivery date for delivery of a purchased product. To require this, the logic file 130 of purchase order 200's solution 124 could be constructed to require a date to be entered into a date-required data-entry field 204. The logic file 130 can be internal to the solution 124, or can be implied from the data file 126 even if the data file 126 is primarily data. The logic file 130 can also be a schema, such as an XML schema.

A solution can govern multiple data files. The exemplary purchase order 200, for example, allows one or more users to fill out many different orders. Each time a user fills out a purchase order form, the system 102 can create a separate data file for that order. Often, a user will create many different data files having the same solution. For each data file edited after the first, the system 102 is likely to have the appropriate solution stored in the memory 116. Thus, if a user previously opened a first data file and later attempts to open a second data file, both of which utilize the purchase order 200 solution, the document manager 122 can silently discover and deploy the purchase order 200 solution to enable the user to edit the second data file. How the document manager 122 discovers and deploys solutions will be discussed in greater detail below.

A solution can be one file or contain many files, so long as the files used to edit data files it governs are included. The solution 124 of FIG. 1 includes the listing file 132, which is a manifest of all of the other files in the solution 124 and contains information helping the document manager 122 to locate them. The logic file 130 and presentation file 128 can be joined or separate. The presentation file 128 helps the document manager 122 present or give a view of a form enabling entry of data into the data file 126, such as a visual representation of the data file 126 by the purchase order 200 electronic form. In some implementations, the presentation file is an XSLT file, which, when applied to an XML data file, generates a XHTML (eXtensible Hyper-Text Markup Language) or HTML (Hyper-Text Markup Language) file. XHTML and HTML files can be used to show a view on the screen 110, such as the purchase order 200 of FIG. 2.

A solution, such as the solution 124, can also include various files or compilations of files, including a manifest file setting forth names and locations for files that are part of the solution 124. The files within the solution 124 can be packaged together, or can be separate. When separate, the list file 132 acts as a manifest of the files within the solution 124. The list file 132 can also include other information, such as definitions, design time information, data source references, and the like. When the files are packaged together, the document manager 122 can simply install and execute the packaged solution file for a particular data file. When not packaged, the document manager 122 can read the list file 132, find the listed files, and install and execute each of the listed files for the particular data file. The list file 132 and the packaged solution file can be interrelated in that a packaged file contains the list file 132 and the list file 132 lists files packaged within the packaged file, although usually only one need be discovered by the system 102 to open a particular data file.

Like solutions, data files can come in various types and styles. As mentioned above, data files can be written in XML or some other mark-up language, or can be written in other languages. Most data files, however, do not contain extensive logic and other files or code. One of the benefits of having data files separate from their solutions, is that it makes the data within them easier to mine. Because the data files are separate from their solution, the document manager 122 makes them easy to open and edit by silently discovering and deploying the solution for the data file.

Data files also are typically concise and data-centered so that the data they contain can be more easily accessed or manipulated by multiple software applications, including software not typically used in a solution, such as an application that searches for a particular type of data and compiles that data into a report. A non-typical application, for example, could be one that compiles a report of all of the purchase orders required to be mailed by a certain date by searching through and compiling the data entered into data files through the date required data-entry field 204 of the purchase order 200 electronic form.

The above devices and applications are merely representative, and other known devices and applications may be substituted for or added to those shown in FIG. 1. One example of another known device that can be substituted for those shown in FIG. 1 is the device shown in FIG. 5.

Techniques for Silent Discovery and Deployment of Data File Solutions Overview

FIG. 3 shows a process 300 for silently discovering and deploying a data file's solution. The process 300 is illustrated as a series of blocks representing individual operations or acts performed by the architecture 100. The process 300 may be implemented in any suitable hardware, software, firmware, or combination thereof. In the case of software and firmware, the process 300 represents a set of operations implemented as computer-executable instructions stored in memory and executable by one or more processors.

Silent Discovery and Deployment

At block 302, the system 102 receives input from a user to open the data file 126. The user may simply click on an icon representing the data file 126 or otherwise select the data file 126 after which the system 102 opens the data file 126.

At block 304, the system 102 discovers a solution identifier in the selected data file 126. This assumes that the data file 126 is one in which the document manager 122 is capable of reading. The document manager 122 can read data files created at some previous time by the user's or another's document manager 122. In one implementation, the document manager 122 can also read the data file 126 if it is created by another application that builds a solution identifier into the data file 126.

This solution identifier can give the system 102 an original source for the solution 124. With an original source for the solution 124, the system 102 has one manner in which to help determine the proper security appropriate for the solution 124. How the system 102 and the document manager 122 handle security for a solution 124 is set forth in greater detail below.

The solution identifier is typically a URL (Uniform Resource Locator) or URN (Uniform Resource Name), but can include other types of names and/or locators. URLs give locations and URNs give names of resources, such as the solution 124, which are typically accessible through the communications network 104. With the solution identifier, the system 102 can determine the original source for the solution 124 (where it first came from) and whether or not the system 102 has seen the solution 124 before.

In one implementation, the solution identifier is part of a processing instruction included within the data file 126. This processing instruction is often part of data files and can include various instructions to host applications, such as the document manager 122. Processing instructions, while not strictly data, do not rise to the level of an applet or application typically included in a solution for a data file. For data files written in XML, for instance, the processing instructions are usually not written in XML, but rather are just a piece of information commonly included. A processing instruction in an XML data file can look like "<? mso-infoPathSolution solutionVersion="1.0.0.3"

PIVersion="1.0.0.0"

href="http://xdsp04-neten/MiladinP/Forms/template.xsn" ?>".

where:
  solutionVersion is the version number of the solution used to generate the XML data (e.g., XML document);
  PIVersion is the version of the processing instruction;
  href is a Universal Resource Name (URN) to the solution; and
  the URN represents the solution.

This processing instruction gives the document manager 122 a solution identifier, which here gives the original source for the solution for the data file. This solution identifier includes the URN indicating that the original location for the solution is at a remote server accessible by accessing the communications network 104 through the network interface 118.

In another implementation, the document manager application 122 determines a solution that is to be used with XML data, such as the data file 126. The solution is determined by locating a Processing Instruction (PI) within the XML data. When the PI is located in the XML data, the payload of the PI is examined to determine the solution that is to be used with the XML data. A Universal Resource Locator (URL) in the PI can be used to identify a location of the solution. The solution can then be retrieved from its location. Once retrieved, the solution can be used to present a visual appearance of the XML data, to receive interactive edits to the XML data from an editing user, and then to update both the visual appearance and the XML data using the edits to the XML data from the editing user. An example of a PI in the XML data that uses a URL for discovery of its corresponding solution is:
  "<?mso-InfoPathSolution
  href="URL to solution"
  name="solution URN"
  version="version number"?>"
  where:
    href is a URL to the solution;
    name is a Universal Resource Name (URN) representing the solution; and
    version is the version number of the solution used to generate the XML data (e.g., XML document).

Another example of a PI that identifies its solution by location is:
  "<?mso-infoPathSolution
  href="file:///\\ndpublic\public\user-alias\Solution\manifest.xsf"
  PIVersion="1.0.0.0"
  solutionVersion="1.0.0.90"
  productVersion="11.0.4920" ?>"

In this example, the PI has five (5) parts. The first part is the name of the PI which is 'mso-infoPathSolution'. The second part is the 'href' that is a URL that specifies the location of the solution. Stated otherwise, the 'href' is a pseudo-attribute of the PI that contains a URL that specifies the location of the solution. The URL, in different alternatives, could refer to an 'http', to a file, or to an 'ftp', in accordance with known file path conventions. Additionally, relative URLs may also be used. The third part is the version of the PI ('PIVersion'). The PIVersion pseudo-attribute is used to identify the version of the PI itself. The fourth part is the 'solutionVersion' which is a pseudo-attribute used to identify the version number of the solution used to generate the corresponding XML document. The fifth part is the productVersion pseudo-attribute that is used to identify the version of the document manager application 122 that created the XML document for which the solution is to be used. In this example, the document manager application 122 is the InfoPath™ software application provided by Microsoft Corporation of Redmond, Wash., USA. Also in this example, the third through fifth parts have the format of 'x.x.x.x'.

The foregoing implementations provide two examples in which a URL in the PI could be used to identify a location of the solution to be used with an XML document. In yet another implementation, a PI in XML data contains a name from which the solution for the XML data can be discovered. Stated otherwise, the PI in the XML data identifies its solution by name. In this case, the document manager application 122 can determine the solution to use with XML data (e.g., the payload) by the schema of the top level node of the structured nodes in the corresponding XML data. As in prior implementations, the document manager application 122 performs a process in which the PI is located and examined. An example a PI that identifies a solution by name is:
  "<?mso-infoPathSolution
  name="urn:schemas-microsoft-com:office:infopath:oob:AbsenceRequest:1033"
  PIVersion="1.0.0.0"
  solutionVersion="1.0.0.0"
  productVersion="11.0.4920" ?>"

In this example, the PI has five (5) parts. The first part is the name of the PI which is 'mso-infoPathSolution'. The second part is a name pseudo-attribute that refers to a URN which is the name of the solution. Such a solution is typically registered with the document manager application 122 before the document is opened, and the document manager application 122 looks it up by name in its list of available solutions. The third through fifth parts are identical to the immediately preceding example. As in the immediately preceding example, the present example also represents that the document manager application 122 is the InfoPath™ software application provided by Microsoft Corporation of Redmond, Wash., USA.

In a still further implementation, the document manager application 122 can determine an online sandboxed solution that is to be used with an XML document. To do so, a PI in the XML document is located. An example of a PI for an online sandboxed solution is:
  "<?mso-xDocsSolution
  version="1.0.0.20"
  href="http://po.car-company.com/po/po.xsf"?>"

In this example, the href contains a solution identifier for which the solution has a path with the suffix '.xsf'.

In yet another implementation, the document manager application 122 can determine a single file online sandboxed solution that is to be used with an XML document. To do so, a PI in the XML document is located. An example of a PI for a single file online sandboxed solution is:
  "<?mso-xDocsSolution version="1.0.0.20"
  href="http://po.car-company.com/po/po.xsn"?>"

In this example, the href contains a solution identifier for which the solution has a path with the suffix '.xsn'.

In another implementation, the document manager application 122 can determine the solution that is to be used with a preexisting electronic form template. To do so, a PI in the XML document is located. An example of a PI for such a case is:
  "<?mso-xDocsSolution
  name="urn:schemas-microsoft-com:office:InfoPath:oob:C9956DCEE66F8924AA31D467D4F366DC"
  version="1.0.0.20"?>"

In this example, the URN in the 'name' attribute is preceded by "InfoPath:oob" to designate that the template is provided with the InfoPath™ software application provided by Microsoft Corporation of Redmond, Wash., USA.

In a still further implementation, the document manager application 122 can determine a trusted solution that is to be used with XML data. To do so, a PI in the XML data is located. An example of a PI for a trusted solution is:

"<?mso-xDocsSolution
name="urn:schemas-microsoft-com:office: po. car-company.com"
version="1.0.0.20"?>"

In this case, the document manager application 122 can determine the solution to use with XML data (e.g., the payload) by the schema of the top level node of the structured nodes in the corresponding XML data. The solution is 'trusted' in the sense that a logical relationship is established between domains to allow pass-through authentication, in which a trusting domain honors the logon authentications of a trusted domain.

One of the advantages of the document manager 122 is that it enables a user to open the data file 126 without the user needing to discover the data file's solution 124, install the solution 124, or even know that the solution 124 exists. This enables users to open data files simply and easily, and in many cases enables them to edit a data file offline that they would otherwise not have been able to edit.

With the solution identifier, the system 102 computes a special name for the solution 124 (block 306). This special name is designed to be a name easily found only by the document manager 122. The special name, because it is computed and findable by the document manager 122 but is not intended to be discoverable by other applications, allows for greater security in downloading possibly hostile solutions from the communications network 104.

In one implementation, the document manager 122 takes the solution identifier and computes a unique special name for the solution identifier. This unique special name is repeatable; the next time the document manager 122 computes a unique special name for the same solution identifier, the same unique special name will be created. By so doing, the document manager 122 can find a previously downloaded solution by computing the unique, special name and then searching for the unique, special name to determine if the solution is available locally for offline use (such as by having the solution stored in the memory 116).

In another implementation, the document manager 122 computes a unique special name by computing a hash, such as a Message Digest 5 hash (MD5 hash), of the solution identifier. By computing a one-way hash of the solution identifier, the document manager 122 creates a unique, special name that is a file of 128 bits from the digits of the solution identifier. The MD5 hash can be computed by knowing the URL. In one implementation, a cache for a solution can be structured as:

%AppData%\InfoPath\Solution Cache\[16 character random GUID]\[MD5 hash of URL or URN, where the random GUID protects the cache from other applications.

The system 102 uses the special name, which corresponds to a solution identifier and thus the data file's solution 124, to search through locally accessible sources for the solution 124 (block 308). The system 102 may, for instance, search files and folders in the memory 116 of FIG. 1 for files and/or folders with the same name as the special name computed in the block 306.

When the Special Name is Found

If the system 102 finds the special name (i.e., the "Yes" branch from block 310) the solution 124 was saved earlier in the system 102 searched locally in the block 308. Thus, when the special name is found, the system 102 knows that the solution 124 referred to in the data file (which the user is attempting to open) is accessible offline by the system 102. The solution 124 is usually stored in the memory 116 but can be stored in other searchable, local sources that the system 102 does not have to go online to find.

The solution 124, stored at the source and found using the special name, may not be current, however. Because of this, the system 102 determines whether or not the system 102 is online or offline (block 312). If online (i.e., the "Yes" branch from block 312), the system 102 will attempt to determine whether or not a more up-to-date solution should be installed (discussed below); if offline, the system 102 will proceed to install the locally stored solution 124 (block 314).

If the Solution is Found and the System is Offline

If the solution 124 is found and the system 102 is offline, the system 102 proceeds to install the solution 124 from the memory 116 or another locally accessible source (block 314).

The system 102 installs the solution 124 silently in that the user does not need to know that the solution 124 was discovered, found, or was being installed. Thus, the system 102 enables a user to edit the data file 126 when offline by silently discovering and deploying the data file's solution 124.

In one implementation, the system 102 installs the solution 124 and then opens the data file 126 in such a manner as to mimic how the data file 126 would be opened had the user opened the data file 126 with the solution accessible online, such as through opening the data file 126 with Microsoft® Internet Explorer®. The system 102 does so to make opening and editing the data file 126 as comfortable for the user as possible, because many users are familiar with opening data files online. One possible difference, however, is that if the system 102 has a slow connection to the communications network 104, the document manager 122, by installing the solution 124 from a local source like the memory 116, may more quickly open the data file 126 than if the user were online.

Also in block 314, the document manager 122 can install the solution 124 for the selected data file with certain constraints for security, which will be discussed in greater detail as part of a process 400 of FIG. 4.

In block 316, the system 102 opens the data file 126 to enable the user to edit the data file 126. One example of an opened data file (and solution) enabling edits is the purchase order 200 of FIG. 2. In this example, the user is able to edit the data file 126 by adding, deleting, or changing data in data entry fields (like the reference number data-entry field 202 and the date required data-entry field 204) even though offline.

Following the previous blocks, a user can easily open a data file offline without having to discover or deploy the data file's solution. This enables users, for example, after first opening a solution online, to open a data file offline. A user can open a data file online and edit it by adding a reference number through the reference number data-entry field 202 of the purchase order 200 electronic form and then stop editing the data file (the data file would contain the added reference number by the system 102 adding the reference number to the data file). The user could then go offline, such as by taking his or her laptop on a business trip, and complete filling out the electronic form. Or the user could send the partially filled-out data file to another user to fill out the rest of the electronic form, which the other user could do so long as the other user's system contains a stored solution. This flexibility allows users and businesses a greater ability to use information by keeping data and solutions separate and by allowing offline use of data files.

If the Solution is Found and the System is Online

Assuming the system 102 finds the special name and the system is online, the system 102 will attempt to determine whether the current solution is the most recent version or a more up-to-date solution is available. In block 318, the system 102 compares the time stamp of the stored solution 124 and the online solution. Since the system 102 is online, it can access the solution (here we assume that the original origin of the solution 124 is from an online source). If the solution identifier from the data file 126 selected by the user contains a reference to the solution 124 being accessible online, the system 102 goes online to check whether or not the online solution is newer than the stored solution 124 (block 320). In one implementation, the system 102 compares the time stamp of the online solution with a time stamp on the stored solution 124.

If the online solution is not newer (i.e., the "No" branch from block 320), the system 102 proceeds to the block 314, installing the stored solution 124. If the online solution is newer than the stored solution 124 (i.e., the "Yes" branch from block 320), the system 102 either replaces the stored solution 124 with the online solution or otherwise updates the older, stored solution 124.

Downloading the Solution for Later Use

In block 322, the architecture 100 (or the system 102 by accessing the communications network 104) downloads a solution into a locally accessible source such as the memory 116. The system 102 downloads this solution when the data file 126 selected by a user contains a solution identifier for a solution for which the system 102 does not have local access (such as it not being cached) or for which the system 102 has local access but the cached or stored version of the solution (the solution 124) is older than the online version.

In either case, the system 102 has already discovered the solution identifier for the solution and computed a special name for the solution. The system 102 then downloads the solution from the online source and saves it into a folder named with the special name (block 324). If a solution already exists in that folder, the system 102 replaces it with the newer version or otherwise updates the currently cached solution. The resulting new or updated version then being the solution 124.

In one implementation, the system 102 saves the solution to a unique location within the system 102's accessible memory. The system 102 does so in cases where the system 102 is used by multiple users. By so doing, the system 102 is able to determine which of the users that use the system 102 or load files into memory locally accessible by the system 102 saved the particular solution. Also by so doing, the system 102 may provide greater security for the computer 112 and its users.

Process 300 in FIG. 3 allows for editing of data files while online or offline. In each of the various implementations discussed above in the context of FIG. 3, the document manager application 122 performed a process in which a PI is located and examined. Stated otherwise, the document manager application 122 performs a process that searches XML data to find a solution of the XML data. In other implementations, the search by document manager application 122 may examine various storage locations for the solution, such as file storage on a network resource that is in communication with a computing device that is executing the document manager application 122. Alternatively, the search may examine local cache in a computing device that is executing the document manager application 122. If the search by the document manager application 122 in the XML data does not locate a PI that specifically identifies the document manager application 122, then a diagnostic can be output, such as by way of a visibly displayed descriptive error. If a PI is found in the search that specifically identifies the document manager application 122, then it is determined if the PI contains a 'href' attribute. If the 'href' attribute is in the PI, then a computation is made of the name of the folder in the solution cache using the URL associated with the 'href' attribute. A look up is first performed on the list of locally cached solutions using the URL in the 'href' attribute (e.g., where the solution is 'online sandboxed'). If, however, the solution is not located in the list of locally cached solutions, then the solution must be retrieved from another resource. In this case, the solution can be downloaded from the URL associated with the 'href' attribute in PI.

In another implementation, where the solution is located in the list of locally cached solutions, it can be ascertained whether the most recent version of the solution has been obtained. To do, a version, electronic tag, or time stamp in the PI can be examined, such as by an auto-update process. If the examination indicates a change in the original solution (e.g., a server copy of the solution is different), then the latest solution can be downloaded. For instance, the document manager application 122 can be configured to explode the solution to a temporary location within the locally cached solutions and then can compare the version of the downloaded solution to the version of the current cached copy of the solution.

If the search by the document manager application 122 finds a PI but fails to locate the solution in the list of locally cached solutions or by download, then a diagnostic can be output, such as by way of a visibly displayed descriptive error. If the search by the document manager application 122 finds a PI that contains a name attribute associated with a URN, a computation can be performed of the name of the folder in the solution using the URN. A lookup can then be performed on an HTML installed solution using the name attribute in a catalog of solutions. If the solution is thereby found, a comparison can be made between the cached version of the solution and the original version of the solution. This comparison is performed to make sure that the cached version of the solution is up-to-date. In the case of the InfoPath™ software application provided by Microsoft Corporation of Redmond, Wash., USA, through the Microsoft Office™ software application, if the name is prefixed by a character string that includes "InfoPath" and "oob", then the XML data located by the application is referring to an InfoPath template or out-of-the-box (OOB) solution. In such a case, an assumption might be made that solutions for the InfoPath templates are installed at a location shared by all users of a specific computing device (e.g., C:\Program Files\Microsoft Office\Templates).

The steps set forth in process 300 in FIG. 3 for discovering and using a solution are described above for various implementations. Still further implementations can be used by the document manager application 122 to discover and use a solution. In these further implementations, the document manager application 122 attempts to associate an XML document with a solution by using a href attribute in a PI in the XML document that points to a URL. In yet other implementations, the document manager application 122 initiates a search in an XML document for a PI having a href attribute, a name, and a version. When the document manager application 122 finds such a PI, the XML document can be associated with a solution through the use of the href attribute (e.g., a URL).

When the InfoPath™ software application provided by Microsoft Corporation of Redmond, Wash., USA, through the Microsoft Office™ software application is used to design an electronic form, a PI in an XML document corresponding to the electronic form will have various characteristics. As such, any document manager application 122 that is attempting to discover a solution for an electronic form that was created by the InfoPath™ software application should be advantageously configured to locate the solution by searching for a PI in the corresponding XML document that has one or more of these various characteristics. When so discovered, the document manager application 122, which may be different than the InfoPath™ software application, can then be used to view and/or interactively enter/change XML data through the electronic form that was created by the InfoPath™ software application.

Once such characteristic of an XML document corresponding to an electronic form that was designed, created, or changed by the InfoPath™ software application is that it has a PI containing the solution identifier that will most likely be the first PI in the XML document corresponding to the electronic form. Another such characteristic is that the PI containing the solution identifier contains both a href attribute and a character string that identifying the PI version and/or the product version of the InfoPath™ software application. The href attribute need not be the first pseudo-attribute in the PI, but could be anywhere in the PI. As such, the PI version could be first in the PI followed by the href attribute. Yet another characteristic is that the target of the PI containing the solution identifier also contains the character string "mso-InfoPathSolution" solution, where that character string is the first character string in the PI and could be followed by a href attribute. Yet another characteristic is that the PI containing the solution identifier contains a URL or URN that will most likely point to a path having a suffix that is either '*.xsf' (e.g., a manifest or listing other files) or '*.xsn' (a file that contains multiple files compressed into one file and that are extractable with the extract '*.exe' utility).

Given the foregoing characteristics of electronic forms designed, created, or changed using the InfoPath™ software application, the document manager application 122 can be configured to discover the solution of an electronic form by simply finding the first PI in the XML document. Alternatively, the document manager application 122 can be configured to discover the solution by examining a PI in the XML document for the electronic form to see if it includes a character string that is likely to represent a solution corresponding to the XML document. When the likelihood is high, the name can be used to discover the solution. As a further alternative, the document manager application 122 can be configured to discover the solution by examining the target of a PI in the corresponding XML document for the character string "mso-InfoPathSolution", and/or by looking for a URL in the PI having a suffix of *.xsf or *.xsn. As yet another alternative, the document manager application 122 can be configured to discover the solution by trying, as a potential solution, each name that is in quotation marks in the PI and is associated with a href attribute in a PI in the XML document, and then using the solution that is returned after a success following one or more of such attempts. As mentioned above, the href attribute need not be the first pseudo-attribute in the PI, and the document manager application 122 may take this into account when assessing the PI for its likelihood of containing the correct solution identifier. In a still further another alternative, the document manager application 122 can be configured to discover the solution by trying as a potential solution each URL in each PI of an XML document, and then using the solution that is returned after a success following one or more of such attempts. As noted above, the URL or URN in the successful PI will most likely point to a '*.xsf' or '*.xsn' path, and the document manager application 122 may take this into account when assessing the PI for its likelihood of containing the correct solution identifier.

Techniques for Secure Deployment of Data File Solutions

Figure 4:
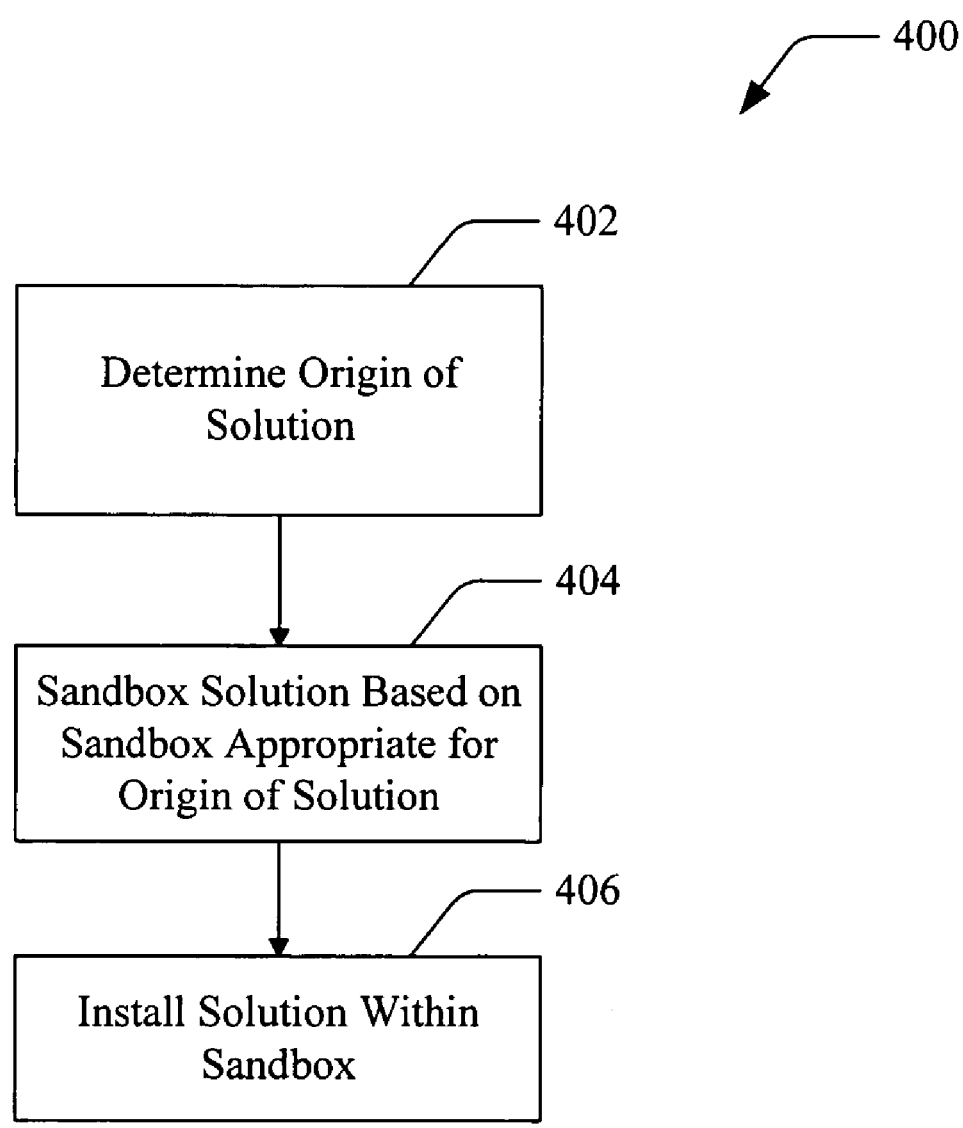
FIG. 4 is a flow diagram of an exemplary process for offline editing of a data file with security by sandboxing the data file's solution application.

FIG. 4 shows a process 400 for making deployment of data file solutions more secure. The process 400 is illustrated as a series of blocks representing individual operations or acts performed by the system 102. The process 400 may be implemented in any suitable hardware, software, firmware, or combination thereof. In the case of software and firmware, the process 400 represents a set of operations implemented as computer-executable instructions stored in memory and executable by one or more processors.

Through the process 300, discussed above, the system 102 enables a user to open and edit a data file by silently discovering and deploying the data file's solution. In the process 400, the system 102 acts to protect the user from the solution because some solutions contain dangerous code, like viruses and worms. To help prevent dangerous code from damaging the user's files and/or computer, the system 102 sandboxes the solution, if appropriate.

As part of this security, the system 102 can be configured to ask a user during an attempt to open a data file how the user wants to sandbox the data file's solution. Many users, however, often do not know what level of sandboxing to chose, and thus the explicit prompting slows the process and consumes unnecessary user time.

To make opening and editing a data file as easy as possible and because many users do not know what level of sandboxing a solution should be run within, the system 102 can be configured to sandbox a solution automatically, as set forth in FIG. 4 and the process 400 below.

In block 402, the system 102 determines the origin of a solution, such as the solution 124 of FIG. 1. The system 102, from block 304, discovered the solution identifier from the data file 126. With this solution identifier, the system 102 can determine the origin of the solution 124.

As discussed above, the solution identifier can be a URL, a URN, or another Uniform Resource Identifier (URI). Either of these can be used to locate and find the source of a solution. URLs usually indicate a non-local, online source for a solution like a remote server accessible through the communications network 104. URNs give the name of a solution, which typically can be accessed online (but could be accessed from a local, offline source), and are less subject to change by those in control of the solution. In either case, these solution identifiers give the system 102 the original source of the solution. The solution may be cached or otherwise stored by the system 102 in a local source (such as the solution 124 in the memory 116), but the local source is not indicated as the solution's origin by the solution's solution identifier, the local source is a new source.

With the origin of the solution known, the document manager 122 sets the appropriate level of security for the solution 124, sandboxing the solution 124 based on its origin (block 404). The document manager 122 sandboxes the solution 124, if from unknown or untrustworthy sources on the global internet with a sandbox allowing the solution 124 very little leeway in the operations it can perform, such as reading or altering other files on the computer 112. Greater trust, and so a weaker sandbox, are used for the solution 124 if it has an origin from known and more trustworthy sources accessed remotely, such as from MSN.com or a company intranet source. Very high trust, requiring a weak or no sandbox, is used for the solution 124 if is has an origin on the computer 112, such as when the user or another person using the user's computer created the solution 124.

Setting security levels and appropriate use of sandboxes for online use of solutions for data files are performed by various internet-capable host applications. The document manager 122, however, opens solutions and sandboxes them based on their origin even when the solution is opened from a local source that differs from the origin of the solution. Typically, internet-capable host applications, such as Internet Explorer®, will not open a solution from a local source silently, but will return an error if the online copy is not available. The document manager 122, however, opens and executes, without user interaction, solutions in appropriate sandboxes even when a solution is loaded from a local source.

In block 406, the system 102 installs the solution 124 within an appropriate sandbox. This appropriate sandbox limits the operations that the solution 124 can perform, thereby helping to protect the computer 112 and its files from the solution 124.

A Computer System

FIG. 5 shows an exemplary computer system that can be used to implement the processes described herein. Computer 542 includes one or more processors or processing units 544, a system memory 546, and a bus 548 that couples various system components including the system memory 546 to processors 544. The bus 548 represents one or more of any of several types of bus structures, including a memory bus or memory controller, a peripheral bus, an accelerated graphics port, and a processor or local bus using any of a variety of bus architectures. The system memory 546 includes read only memory (ROM) 550 and random access memory (RAM) 552. A basic input/output system (BIOS) 554, containing the basic routines that help to transfer information between elements within computer 542, such as during start-up, is stored in ROM 550.

Computer 542 further includes a hard disk drive 556 for reading from and writing to a hard disk (not shown), a magnetic disk drive 558 for reading from and writing to a removable magnetic disk 560, and an optical disk drive 562 for reading from or writing to a removable optical disk 564 such as a CD ROM or other optical media. The hard disk drive 556, magnetic disk drive 558, and optical disk drive 562 are connected to the bus 548 by an SCSI interface 566 or some other appropriate interface. The drives and their associated computer-readable media provide nonvolatile storage of computer-readable instructions, data structures, program modules and other data for computer 542. Although the exemplary environment described herein employs a hard disk, a removable magnetic disk 560 and a removable optical disk 564, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 556, magnetic disk 560, optical disk 564, ROM 550, or RAM 552, including an operating system 570, one or more application programs 572 (such as the document manager application 122), other program modules 574, and program data 576. A user may enter commands and information into computer 542 through input devices such as a keyboard 578 and a pointing device 580. Other input devices (not shown) may include a microphone, joystick, game pad, satellite dish, scanner, or the like. These and other input devices are connected to the processing unit 544 through an interface 582 that is coupled to the bus 548. A monitor 584 or other type of display device is also connected to the bus 548 via an interface, such as a video adapter 586. In addition to the monitor, personal computers typically include other peripheral output devices (not shown) such as speakers and printers.

Computer 542 commonly operates in a networked environment using logical connections to one or more remote computers, such as a remote computer 588. The remote computer 588 may be another personal computer, a server, a router, a network PC, a peer device or other common network node, and typically includes many or all of the elements described above relative to computer 542. The logical connections depicted in FIG. 5 include a local area network (LAN) 590 and a wide area network (WAN) 592. Such networking environments are commonplace in offices, enterprise-wide computer networks, intranets, and the Internet.

When used in a LAN networking environment, computer 542 is connected to the local network through a network interface or adapter 594. When used in a WAN networking environment, computer 542 typically includes a modem 596 or other means for establishing communications over the wide area network 592, such as the Internet. The modem 596, which may be internal or external, is connected to the bus 548 via a serial port interface 568. In a networked environment, program modules depicted relative to the personal computer 542, or portions thereof, may be stored in the remote memory storage device. It will be appreciated that the network connections shown are exemplary and other means of establishing a communications link between the computers may be used.

Generally, the data processors of computer 542 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the blocks described below in conjunction with a microprocessor or other data processor. The invention also includes the computer itself when programmed according to the methods and techniques described herein.

For purposes of illustration, programs and other executable program components such as the operating system are illustrated herein as discrete blocks, although it is recognized that such programs and components reside at various times in different storage components of the computer, and are executed by the data processor(s) of the computer.

CONCLUSION

The above-described system and method enables a user to edit data files when offline by discovering and deploying the data file's solution application. Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A computer implemented method comprising:
reading a processing instruction (PI) in an XML data file governed by a solution to determine the solution's origin, wherein the PI contains an entity selected from the group consisting of:
a href attribute that points to a URL;
a name;
a target that includes a character string that identifies an application used to create an HTML electronic form associated with the XML data file;
and
a href attribute and at least one of a PI version and a product version;
determining security precautions for executing the solution based on the solution's origin; and
silently installing the solution from a source other than the solution's origin within a sandbox enforcing the security precautions.

2. The method of claim 1, wherein the silently installing the solution further comprises an act selected from the group consisting of:
(i) discovering the solution using the URL in the PI;
(ii) examining the name of the PI to assess the likelihood that the PI includes a solution identifier for the solution; and
when the likelihood exceeds a threshold, discovering the solution using the name in the PI;
(iii) examining one of a URL or an URN in the PI to assess the likelihood that the PI includes a solution identifier for the solution; and
when the likelihood exceeds a threshold, discovering the solution using the one of a URL or an URN;
(iv) discovering the solution using a name associated with the href attribute;
(v) discovering the solution using a name in the PI that is associated with the href attribute; and
(vi) a combination of the foregoing.

3. The method of claim 1, wherein determining security precautions based on the solution's origin includes a high level of security precautions when the solution's origin is a remote server accessed through a global internet.

4. The method of claim 1, wherein determining security precautions based on the solution's origin includes a low level of security precautions when the solution's origin is a locally-accessible memory source.

5. The method of claim 1, wherein determining security precautions based on the solution's origin includes a moderate level of security precautions when the solution's origin is a remote server accessed through an intranet.

6. The method of claim 1, wherein the source other than the solution's origin is a local memory source.

7. The method of claim 1, further comprising, without user interaction:
opening the XML data file governed by the solution, wherein:
the solution includes an XSLT presentation application and an XML schema;
the XML data file can be inferred from the XML schema; and
portions of the XML data file are logically coupled with fragments of the XML schema;
executing the XSLT presentation application to transform the coupled portions of the XML data file into the HTML electronic form containing data-entry fields associated with the coupled portions.

8. The method as defined in claim 7, wherein one or more of the reading, the determining, and the silently installing are performed by the execution of a document manager application that is different from the application used to create the HTML electronic form associated with the XML data file.

9. The method as defined in claim 7, wherein:
the data-entry fields of the HTML electronic form map to a corresponding plurality of nodes of the XML document; and
the method further comprises:
receiving, through the data-entry fields, data input by a user for storage in a corresponding said node in the XML document; and
outputting data in XML for viewing by the user in the HTML electronic form through the data-entry fields via the mapping of the data-entry fields from corresponding said nodes of the XML document.

10. The method as defined in claim 1, wherein the character string includes "mso-InfoPathSolution".

11. A computer-readable medium comprising instruction that, when executed by a computer, performs acts of:
reading a processing instruction (PI) in an XML data file governed by a solution to determine the solution's origin, wherein the PI contains an entity selected from the group consisting of:
a href attribute that points to a URL;
a name;
a target that includes a character string that identifies an application used to create an HTML electronic form associated with the XML data file;
and
a href attribute and at least one of a PI version and a product version;
determining security precautions for executing the solution based on the solution's origin; and
silently installing the solution from a source other than the solution's origin within a sandbox enforcing the security precautions.

12. A system comprising:
a display having a screen capable of displaying icons or text representing an XML data file;
a user-input device capable of enabling a user to select the XML data file;
a network interface capable of communicating with a communications network to download an XML data file's solution application;
a computer capable of executing applications and communicating with a local memory source to store the XML data file's solution application; and
a document manager application executable on the computer and configured to:
read a PI in the XML data file from the local memory source without user interaction, wherein the PI contains an entity selected from the group consisting of:
a href attribute that points to a URL;
a name;
a target that includes a character string that identifies an application used to create an HTML electronic form associated with the XML data file; and a href attribute and at least one of a PI version and a product version;

discover and deploy, without user interaction, the XML data file's solution using the entity.

13. The system as defined in claim 12, wherein the character string includes "mso-InfoPathSolution".

14. The system of claim 12, wherein the discover and deploy further comprises an act selected from the group consisting of:
(i) discovering the XML data file's solution using the URL in the PI;
(ii) examining the name of the PI to assess the likelihood that the PI includes a solution identifier for the XML data file's solution; and
when the likelihood exceeds a threshold, discovering the XML data file's solution using the name in the PI;
(iii) examining one of a URL or an URN in the PI to assess the likelihood that the PI includes a solution identifier for the XML data file's solution; and
when the likelihood exceeds a threshold, discovering the XML data file's solution using the one of a URL or an URN;
(iv) discovering the XML data file's solution using a name associated with the href attribute;
(v) discovering the XML data file's solution using a name in the PI that is associated with the href attribute; and
(vi) a combination of the foregoing.

15. The system of claim 12, wherein the document manager application is further configured to:
open the XML data file governed by the XML data file's solution, wherein:
the XML data file's solution includes an XSLT presentation application and an XML schema;
the XML data file can be inferred from the XML schema; and
portions of the XML data file are logically coupled with fragments of the XML schema;
execute the XSLT presentation application to transform the coupled portions of the XML data file into the HTML electronic form containing data-entry fields associated with the coupled portions.

16. The system as defined in claim 15, wherein the document manager application is different from the application used to create the HTML electronic form associated with the XML data file.

17. The system as defined in claim 15, wherein:
the data-entry fields of the HTML electronic form map to a corresponding plurality of nodes of the XML document; and
the document manager application is further configured to:
receive, through the data-entry fields, data input by a user for storage in a corresponding said node in the XML document; and
output data in XML for viewing by the user in the HTML electronic form through the data-entry fields via the mapping of the data-entry fields from corresponding said nodes of the XML document.

18. The system of claim 12, wherein the document manager application is further capable of silently deploying the XML data file's solution within a sandbox.

19. An apparatus comprising:
means for displaying a representation of an XML data file;
means for selecting the XML data file;
processor means for reading a processor instruction (PI) in the XML data file, wherein the PI contains an entity selected from the group consisting of:
a href attribute that points to a URL;
a name;
a target that includes a character string that identifies an application used to create an HTML electronic form associated with the XML data file;
and
a href attribute and at least one of a PI version and a product version;
means, using the entity, for discovering and deploying, without user interaction, a solution application governing the XML data file from an offline memory source;
means for displaying the HTML electronic form, wherein the HTML electronic form represents a product of the solution application and the XML data file;
means for enabling a user to enter information into the HTML electronic form;
means for receiving information entered into the HTML electronic form;
and
means for altering the XML data file to reflect the information received.

20. The apparatus of claim 19, wherein means for discovering and deploying further comprises means selected from the group consisting of:
(i) means for discovering the solution application using the URL in the PI;
(ii) means for examining the name of the PI to assess the likelihood that the PI includes a solution identifier for the solution application; and
means, when the likelihood exceeds a threshold, for discovering the solution application using the name in the PI;
(iii) means for examining one of a URL or an URN in the PI to assess the likelihood that the PI includes a solution identifier for the solution application; and
means, when the likelihood exceeds a threshold, for discovering the solution application using the one of a URL or an URN;
(iv) means for discovering the solution application using a name associated with the href attribute;
(v) means for discovering the solution application using a name in the PI that is associated with the href attribute; and
(vi) a combination of the foregoing.

21. The apparatus of claim 19, wherein:
the solution application includes an XSLT presentation application and an XML schema;
the XML data file can be inferred from the XML schema; and
portions of the XML data file are logically coupled with fragments of the XML schema;
the XSLT presentation application can be applied to transform the coupled portions of the XML data file into an HTML electronic form containing data-entry fields associated with the coupled portions.

22. The apparatus as defined in claim 19, further comprising a document manager application that includes the means for displaying, the means for enabling, the means for receiving, and the means for altering, wherein the document manager application is different from the application used to create the HTML electronic form associated with the XML data file.

23. The apparatus as defined in claim 19, wherein:
the user enters the information into the HTML electronic form in data-entry fields of the HTML electronic form that map to a corresponding plurality of nodes of the XML document;

the means for receiving information entered into the HTML electronic form receives, through the data-entry fields, data input by the user for storage in corresponding said nodes in the XML document; and the means for altering the XML data file to reflect the information received maps the data-entry fields to corresponding said nodes of the XML document.

24. The apparatus of claim 19, the means, using the entity, for discovering and deploying further comprises means for deploying the solution application within a sandbox providing security based on the solution application's origin.

25. The apparatus as defined in claim 19, wherein the character string includes "mso-InfoPathSolution".

26. The computer readable medium as defined in claim 19, wherein the character string includes "mso-InfoPathSolution".

27. A computer readable medium comprising instruction that, when executed:

reads a processing instruction (PI) in an XML data file governed by a solution to determine the solution's origin, wherein the PI contains an href attribute that points to a URL;

determines security precautions for executing the solution based on the solution's origin, wherein the security precautions indicate a trust level in the solution; and silently installs the solution from a source other than the solution's origin within a sandbox enforcing the security precautions to limit operations of the solution according to the trust level.

28. A computer readable medium comprising instruction that, when executed:

reads a processing instruction (PI) in an XML data file governed b a solution to determine the solution's origin, wherein the PI contains a name;

determines security precautions for executing the solution based on the solution's origin, wherein the security precautions indicate a trust level in the solution; and silently installs the solution from a source other than the solution's origin within a sandbox enforcing the security precautions to limit operations of the solution according to the trust level.

29. A computer readable medium comprising instruction that, when executed:

reads a processing instruction (PI) in an XML data file governed by a solution to determine the solution's origin, wherein the PI contains a target that includes a character string that identifies an application used to create an HTML electronic form associated with the XML data file;

determines security precautions for executing the solution based on the solution's origin, wherein the security precautions indicate a trust level in the solution; and silently installs the solution from a source other than the solution's origin within a sandbox enforcing the security precautions to limit operations of the solution according to the trust level.

30. A computer readable medium comprising instruction that, when executed by a computer:

reads a processing instruction (PI) in an XML data file governed by a solution to determine the solution's origin, wherein the PI contains a href attribute and at least one of a PI version and a product version;

determines security precautions for executing the solution based on the solution's origin, wherein the security precautions indicate a trust level in the solution; and silently installs the solution from a source other than the solution's origin within a sandbox enforcing the security precautions to limit operations of the solution according to the trust level.

* * * * *